(12) United States Patent
Sato

(10) Patent No.: US 6,582,046 B1
(45) Date of Patent: Jun. 24, 2003

(54) METHOD AND DEVICE FOR IMAGE PROCESSING

(75) Inventor: Hitoshi Sato, Tokyo (JP)

(73) Assignee: Copyer Co., Ltd., Tokyo (JP)

( * ) Notice: Subject to any disclaimer, the term of this patent is extended or adjusted under 35 U.S.C. 154(b) by 0 days.

(21) Appl. No.: 09/857,253

(22) PCT Filed: Dec. 27, 1999

(86) PCT No.: PCT/JP99/07339

§ 371 (c)(1),
(2), (4) Date: May 31, 2001

(87) PCT Pub. No.: WO00/40001

PCT Pub. Date: Jul. 6, 2000

(30) Foreign Application Priority Data

Dec. 25, 1998 (JP) .............................. 10-376671
Dec. 25, 1998 (JP) .............................. 10-376673

(51) Int. Cl.⁷ ................................................ B41J 2/205
(52) U.S. Cl. ....................................................... 347/15
(58) Field of Search ............................ 347/15, 43, 19; 358/2.99, 3.01, 3.06

(56) References Cited

U.S. PATENT DOCUMENTS 5,136,401 A * 8/1992 Yamamoto et al. ......... 358/474

FOREIGN PATENT DOCUMENTS

| JP | 61-154364 | 7/1986 |
|---|---|---|
| JP | 62-35852 | 2/1987 |
| JP | 1-163071 | 6/1989 |
| JP | 2-162871 | 6/1990 |
| JP | 6-339008 | 12/1994 |
| JP | 7-85273 | 3/1995 |
| JP | 10-304202 | 11/1998 |

* cited by examiner

*Primary Examiner*—Thinh Nguyen
(74) *Attorney, Agent, or Firm*—Dellett & Walters

(57) ABSTRACT

A method and device for image processing free from full loss of an entire vector in a halftone image relatively low in density. An N*N mask matrix is generated for a given density, based on an N*N dither matrix used in an area gradation method which represents a halftone image with binary (bi-level) image data from multi-level image data. In a case of N*N mask matrix relatively low in density, rearrangements on a column and row basis are performed (N*N−1) times to generate (N*N−1) number of N*N mask matrices which are then combined with the original N*N mask matrix to form an (N*N)*(N*N) mask matrix. Thus, for a halftone image relatively low in density, a binary halftone image is generated via the (N*N)*(N*N) mask matrix from multi-level image data.

13 Claims, 27 Drawing Sheets

FIG. 5  bayerDither_tbl
| 0 | 128 | 32 | 160 | 8 | 136 | 40 | 168 |
|---|---|---|---|---|---|---|---|
| 192 | 64 | 224 | 96 | 200 | 72 | 232 | 104 |
| 48 | 176 | 16 | 144 | 56 | 184 | 24 | 152 |
| 240 | 112 | 208 | 80 | 248 | 120 | 216 | 88 |
| 12 | 140 | 44 | 172 | 4 | 132 | 36 | 164 |
| 204 | 76 | 236 | 108 | 196 | 68 | 228 | 100 |
| 60 | 188 | 28 | 156 | 52 | 180 | 20 | 148 |
| 252 | 124 | 220 | 92 | 244 | 116 | 212 | 84 |
FIG. 6  MATRIX FOR DENSITY OF 50%
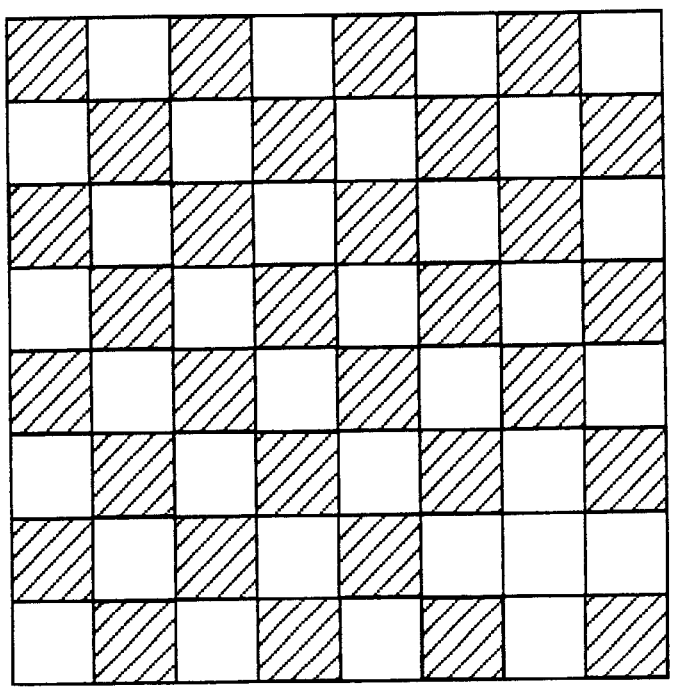

DENSITY OF 33%

DENSITY OF 66%

DENSITY OF 8%

DENSITY OF 24%

DENSITY OF 5%

DENSITY OF 3%

DENSITY OF 2%

DENSITY OF LOWER THAN 2% (NON-ZERO)

FIG. 17

|   | 1 | 2 | 3 | 4 | 5 | 6 | 7 | 8 |
|---|---|---|---|---|---|---|---|---|
| 1 | P1 | P2 | P3 | P4 | P5 | P6 | P7 | P8 |
| 2 | P9 | P10 | P11 | P12 | P13 | P14 | P15 | P16 |
| 3 | P17 | P18 | P19 | P20 | P21 | P22 | P23 | P24 |
| 4 | P25 | P26 | P27 | P28 | P29 | P30 | P31 | P32 |
| 5 | P33 | P34 | P35 | P36 | P37 | P38 | P39 | P40 |
| 6 | P41 | P42 | P43 | P44 | P45 | P46 | P47 | P48 |
| 7 | P49 | P50 | P51 | P52 | P53 | P54 | P55 | P56 |
| 8 | P57 | P58 | P59 | P60 | P61 | P62 | P63 | P64 |

FIG. 18

|   | 1 | 2 | 8 | 3 | 7 | 4 | 6 | 5 |
|---|---|---|---|---|---|---|---|---|
| 1 | P1 | P2 | P8 | P3 | P7 | P4 | P6 | P5 |
| 2 | P9 | P10 | P16 | P11 | P15 | P12 | P14 | P13 |
| 8 | P57 | P58 | P64 | P59 | P63 | P60 | P62 | P61 |
| 3 | P17 | P18 | P24 | P19 | P23 | P20 | P22 | P21 |
| 7 | P49 | P50 | P56 | P51 | P55 | P52 | P54 | P53 |
| 4 | P25 | P26 | P32 | P27 | P31 | P28 | P30 | P29 |
| 6 | P41 | P42 | P48 | P43 | P47 | P44 | P46 | P45 |
| 5 | P33 | P34 | P40 | P35 | P39 | P36 | P38 | P37 |

F I G. 2 3

```
unsigned char    BayerDither_8Matrix[65][8] = {
    { 0x00, 0x00, 0x00, 0x00, 0x00, 0x00, 0x00, 0x00 },  /* DENSITY 0% /*
    { 0x80, 0x00, 0x00, 0x00, 0x00, 0x00, 0x00, 0x00 },  /* FIG. 14 /*
    { 0x80, 0x00, 0x00, 0x00, 0x08, 0x00, 0x00, 0x00 },  /* FIG. 13 /*
    { 0x88, 0x00, 0x00, 0x00, 0x08, 0x00, 0x00, 0x00 },  /* FIG. 12 /*
    { 0x88, 0x00, 0x00, 0x00, 0x88, 0x00, 0x00, 0x00 },  /* FIG. 11 /*
    { 0x88, 0x00, 0x20, 0x00, 0x88, 0x00, 0x00, 0x00 },
    { 0x88, 0x00, 0x20, 0x00, 0x88, 0x00, 0x02, 0x00 },  /* FIG. 9 /*
         ········OMITTED········
    { 0xaa, 0x00, 0xaa, 0x00, 0xaa, 0x00, 0xaa, 0x00 },  /* FIG. 10 /*
         ········OMITTED········
    { 0xaa, 0x44, 0xaa, 0x01, 0xaa, 0x44, 0xaa, 0x01 },  /* FIG. 7 /*
         ········OMITTED········
    { 0xaa, 0x55, 0xbb, 0x55, 0xaa, 0x55, 0xaa, 0x55 },  /* FIG. 6   DENSITY 50% /*
         ········OMITTED········
    { 0xff, 0x55, 0xbb, 0x55, 0xef, 0x55, 0xbb, 0x55 },  /* FIG. 8 /*
         ········OMITTED········
    { 0xff, 0xff, 0xff, 0xff, 0xff, 0xff, 0xff, 0xff },  /* DENSITY 100% /*
```

FIG. 24

```
unsigned char    BayerDither_64Matrix[65][512] = {
    { /* MASK MATRIX FOR DENSITY OF 0% /*
      0x00, 0x00, 0x00, 0x00, 0x00, 0x00, 0x00, 0x00,
      0x00, 0x00, 0x00, 0x00, 0x00, 0x00, 0x00, 0x00,
         ·········OMITTED·········
    },
    { /* MASK MATRIX FOR DENSITY OF HIGHER THAN 0% BUT LOWER THAN 2% /*
      0x80, 0x00, 0x00, 0x00, 0x00, 0x00, 0x00, 0x00,
      0x00, 0x00, 0x80, 0x00, 0x00, 0x00, 0x00, 0x00,
      0x00, 0x00, 0x00, 0x00, 0x80, 0x00, 0x00, 0x00,
      0x00, 0x00, 0x00, 0x00, 0x00, 0x00, 0x00, 0x00,
      0x88, 0x00, 0x20, 0x00, 0x88, 0x00, 0x80, 0x00,
      0x00, 0x00, 0x00, 0x00, 0x00, 0x00, 0x00, 0x80,
         ·········OMITTED·········
    },
         ················OMITTED·········
    { /* MASK MATRIX FOR DENSITY OF 100% /*
      0xff, 0xff, 0xff, 0xff, 0xff, 0xff, 0xff, 0xff,
      0xff, 0xff, 0xff, 0xff, 0xff, 0xff, 0xff, 0xff,
         ·········OMITTED·········
    }
};
```

FIG. 25

| No. | CONDITION | ACTION |
|---|---|---|
| 1 | LINE IS ONE DOT THICK AND INCLINED AT 45 DEGREES | CHANGE THE SHADE PATTERN IF DENSITY IS EQUAL TO OR LOWER THAN 66% |
| 2 | LINE IS ONE DOT THICK AND INCLINED AT DEGREES OTHER THAN 45 DEGREES | CHANGE THE SHADE PATTERN IF DENSITY IS EQUAL TO OR LOWER THAN 33% |
| 3 | LINE IS TWO DOTS THICK AND IS NOT VERTICAL | CHANGE THE SHADE PATTERN IF DENSITY IS EQUAL TO OR LOWER THAN 24% |
| 4 | LINE IS TWO DOTS THICK AND VERTICAL | CHANGE THE SHADE PATTERN IF DENSITY IS EQUAL TO OR LOWER THAN 8% |
| 5 | LINE IS THREE AND FOUR DOTS THICK | CHANGE THE SHADE PATTERN IF DENSITY IS EQUAL TO OR LOWER THAN 8% |
| 6 | LINE IS FIVE DOTS THICK | CHANGE THE SHADE PATTERN IF DENSITY IS EQUAL TO OR LOWER THAN 5% |
| 7 | LINE IS SIX, SEVEN, EIGHT, AND NINE DOTS THICK | CHANGE THE SHADE PATTERN IF DENSITY IS EQUAL TO OR LOWER THAN 3% |
| 8 | LINE IS TEN DOTS THICK | CHANGE THE SHADE PATTERN IF DENSITY IS EQUAL TO OR LOWER THAN 2% |
| 9 | LINE IS 11 DOTS OR THICKER | NO CHANGE NEEDED |

FIG. 27

| No. | CONDITION | ACTION |
|---|---|---|
| 1 | LINE IS ONE DOT THICK AND INCLINED AT 45 DEGREES | CHANGE THE SHADE PATTERN IF DENSITY IS EQUAL TO OR LOWER THAN 66% |
| 2 | LINE IS ONE DOT THICK AND INCLINED AT DEGREES OTHER THAN 45 DEGREES | CHANGE THE SHADE PATTERN IF DENSITY IS EQUAL TO OR LOWER THAN 33% |
| 3 | LINE IS ONE DOT LONG | CHANGE THE SHADE PATTERN IF DENSITY IS EQUAL TO OR LOWER THAN 33% |
| 4 | LINE IS TWO DOTS THICK AND IS NOT VERTICAL | CHANGE THE SHADE PATTERN IF DENSITY IS EQUAL TO OR LOWER THAN 24% |
| 5 | LINE IS TWO DOTS THICK AND VERTICAL | CHANGE THE SHADE PATTERN IF DENSITY IS EQUAL TO OR LOWER THAN 8% |
| 6 | LINE IS TWO DOTS LONG | CHANGE THE SHADE PATTERN IF DENSITY IS EQUAL TO OR LOWER THAN 8% |
| 7 | LINE IS THREE AND FOUR DOTS THICK | CHANGE THE SHADE PATTERN IF DENSITY IS EQUAL TO OR LOWER THAN 8% |
| 8 | LINE IS THREE OR FOUR DOTS LONG | CHANGE THE SHADE PATTERN IF DENSITY IS EQUAL TO OR LOWER THAN 8% |
| 9 | LINE IS FIVE DOTS THICK | CHANGE THE SHADE PATTERN IF DENSITY IS EQUAL TO OR LOWER THAN 5% |
| 10 | LINE IS FIVE DOTS LONG | CHANGE THE SHADE PATTERN IF DENSITY IS EQUAL TO OR LOWER THAN 5% |
| 11 | LINE IS SIX, SEVEN, EIGHT, AND NINE DOTS THICK AND LONG | CHANGE THE SHADE PATTERN IF DENSITY IS EQUAL TO OR LOWER THAN 3% |
| 12 | LINE IS TEN DOTS THICK OR LONG | CHANGE THE SHADE PATTERN IF DENSITY IS EQUAL TO OR LOWER THAN |
| 13 | LINE IS 11 DOTS THICK OR THICKER OR LONG OR LONGER | NO CHANGE NEEDED |

FIG. 31

THINNING TABLE 28

(LOW-ORDER DIGIT OF 2-DIGIT HEXADECIMAL NUMBER)

| (HIGH-ORDER DIGIT OF 2-DIGIT HEXADECIMAL NUMBER) | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 00 | 01 | 02 | 05 | 04 | 05 | 05 | 15 | 08 | 09 | 0a | 15 | 0a | 15 | 15 | 55 |
| 1 | 10 | 11 | 12 | 15 | 14 | 15 | 15 | 55 | 14 | 29 | 2a | 55 | 2a | 55 | 55 | 55 |
| 2 | 20 | 21 | 22 | 25 | 24 | 25 | 25 | 55 | 24 | 55 | 55 | 55 | 55 | 55 | 55 | 55 |
| 3 | 50 | 51 | 52 | 55 | 54 | 55 | 55 | 55 | 54 | 55 | 55 | 55 | 55 | 55 | 55 | 55 |
| 4 | 40 | 41 | 42 | 45 | 44 | 45 | 45 | 55 | 48 | 49 | 4a | 55 | 4a | 55 | 55 | 55 |
| 5 | 50 | 51 | 52 | 55 | 54 | 55 | 55 | 55 | 54 | 55 | 55 | 55 | 55 | 55 | 55 | 55 |
| 6 | 50 | 51 | 52 | 55 | 54 | 55 | 55 | 55 | 54 | 55 | 55 | 55 | 55 | 55 | 55 | 55 |
| 7 | 51 | 55 | 55 | 55 | 55 | 55 | 55 | 55 | 55 | 55 | 55 | 55 | 55 | 55 | 55 | 55 |
| 8 | 40 | 41 | 42 | 45 | 44 | 45 | 45 | 55 | 48 | 49 | 4a | 55 | 55 | 55 | 55 | 55 |
| 9 | 55 | 55 | 55 | 55 | 55 | 55 | 55 | 55 | 55 | 55 | 55 | 55 | 55 | 55 | 55 | 55 |
| a | 55 | 55 | 55 | 55 | 55 | 55 | 55 | 55 | 55 | 55 | 55 | 55 | 55 | 55 | 55 | 55 |
| b | 55 | 55 | 55 | 55 | 55 | 55 | 55 | 55 | 55 | 55 | 55 | 55 | 55 | 55 | 55 | 55 |
| c | 55 | 55 | 55 | 55 | 55 | 55 | 55 | 55 | 55 | 55 | 55 | 55 | 55 | 55 | 55 | 55 |
| d | 55 | 55 | 55 | 55 | 55 | 55 | 55 | 55 | 55 | 55 | 55 | 55 | 55 | 55 | 55 | 55 |
| e | 55 | 55 | 55 | 55 | 55 | 55 | 55 | 55 | 55 | 55 | 55 | 55 | 55 | 55 | 55 | 55 |
| f | 55 | 55 | 55 | 55 | 55 | 55 | 55 | 55 | 55 | 55 | 55 | 55 | 55 | 55 | 55 | 55 |

(f) 1111 1111 (0xff) ⇒ 0101 0101 (0x55)

SHADE PATTERN
BEFORE CHANGE

| 1 1 1 1  1 1 1 1 | (0xff) |
| 0 1 0 1  0 1 0 1 | (0x55) |
| 1 0 1 1  1 0 1 1 | (0xbb) |
| 0 1 0 1  0 1 0 1 | (0x55) |
| 1 1 1 0  1 1 1 1 | (0xef) |
| 0 1 0 1  0 1 0 1 | (0x55) |
| 1 0 1 1  1 0 1 1 | (0xbb) |
| 0 1 0 1  0 1 0 1 | (0x55) |

→

SHADE PATTERN
AFTER CHANGE

| 0 1 0 1  0 1 0 1 | (0x55) |
| 0 1 0 1  0 1 0 1 | (0x55) |
| 0 1 0 1  0 1 0 1 | (0x55) |
| 0 1 0 1  0 1 0 1 | (0x55) |
| 0 1 0 1  0 1 0 1 | (0x55) |
| 0 1 0 1  0 1 0 1 | (0x55) |
| 0 1 0 1  0 1 0 1 | (0x55) |
| 0 1 0 1  0 1 0 1 | (0x55) |

METHOD AND DEVICE FOR IMAGE PROCESSING

TECHNICAL FIELD

The present invention relates to area gradation processing for image data of a multi-valued or multi-level image, such as a monochrome halftone image or a color image. The present invention also relates to an ink jet image forming device which forms an image by ejecting ink dots on paper through an ink jet head installed on a carriage that scans in the direction substantially perpendicular to the paper conveyance direction, and more particularly, to an ink jet image forming device that records data in a single pass method.

BACKGROUND ART

Area gradation processing is used to represent a grayscale or halftone image on a display, a printer, or a plotter capable of displaying with only two values, 0:OFF and 1:ON. This area gradation processing, widely known, refers to the processing based on a method for representing gray levels of an image by changing the ratio of ON dots to all dots in a relatively small unit area of an image. In general, an N*N matrix (where, "*" indicates a multiplication operator) produces N*N+1 gray levels. This is because the matrix gives unit areas composed of respectively N*N+1 different ON dots, from 0 to N*N. For example, an 8*8 matrix gives 65 gray levels. The larger value of N gives more gray levels but requires more memory capacity.

A 4*4 matrix or an 8*8 matrix is usually used for an image forming device such as a printer or a plotter that analyzes vector data. Recently, some image forming devices use a 128*128 matrix.

Regarding dot arrangement patterns in the matrix, dot distribution types such as a Bayer type and dot concentration types such as an eddy type and a mesh type are known. It is said that the dot distribution type is better in resolution and that dot concentration type is better in linear reproducibility of gradation.

FIG. 5 shows an 8*8 Bayer type dither matrix. Numeric values, 0 to 252 in increments of 4, are assigned to 64 cell positions, and each numeric value is used as a threshold for binarization or conversion from multi-level data to binary (or bi-level) data.

Normally, one vector is represented by the coordinates of the starting-end point and the terminating-end point, line width, end-point edge shape, gray level, and so on. Therefore, a dithering matrix cannot be applied directly to vector data unlike to image data. To represent the gray level of vector data, it is necessary to form a mask matrix having an ON/OFF dot pattern corresponding to a density (gray level) value of the vector based on the dither matrix as shown in FIG. 5.

FIG. 6 shows a mask matrix for density of 50%. In the case of the dither matrix shown in FIG. 5, the mask matrix is formed in the following manner. That is, if the density value of 100% is 255, then the density value of 50% is 127. Thus, the cells in the matrix shown in FIG. 5 whose values are 127 or smaller are set to ON with the cells whose values are larger than 127 set to OFF. In the example shown in FIG. 5, black (hatching) cells indicate ON and white cells indicate OFF.

FIG. 7 shows a mask matrix for density of 33%. In this case, because the density value is 85, the cells whose values ranges from 0 to 84 are set to ON with the other cells set to OFF. Similarly, FIG. 8 shows a mask matrix for density of 66%.

Referring to FIG. 22, how to represent halftone (shade) of a vector will be described. The figure to the left of the arrow in FIG. 22 indicates a vector represented by data such as starting-end and terminating-end points. The figure to the right of the arrow indicates the output result of the vector data for density of 50%. To convert vector data to halftone raster data in this way, the mask matrix described above is repetitively tiled (close to each other) beginning with the anchor corner (filling base point) as shown in FIG. 19 and, when vector data is to be converted to raster data, the raster pixels for which no gray level is considered (fully ON) are ANDed with the tiled ON/OFF dot pattern to create raster data.

FIG. 19 shows a mask matrix tiling pattern for density of lower than 2% as a typical low density. The example in the figure is to show whether or not data of a vector of one dot in line width generates ON dots when the density is lower than 2%. A mask matrix for density lower than 2% but not 0% is shown in FIG. 14. A pattern obtained by tiling this mask matrix is the mask matrix tiling pattern shown in FIG. 19. Line A shown in FIG. 19, one dot in width, is a horizontal line that lies on ON dots of the tiling pattern, with one ON dot generated every eight dots. However, lines B and C, each one dot in width, generate no ON dots at all and have their vector data fully lost because of their positions and inclination angles.

Recently, an increase in computer performance makes available a variety of graphics and CAD application software and diversifies color processing. Normally, when a print driver or a plotter driver creates vector data, the driver generates pen colors and density values and transfers the data to the printer or plotter. At this time, a low density, if set by the application, may cause vectors to be fully lost as described above.

It is an object of the present invention to provide a highly reliable image processing method and an image forming device that prevent vectors from being fully lost even in a halftone image of a relatively low density.

In an image forming device using an ink jet recording method, a plurality of ink-eject nozzles are usually arranged in the direction substantially perpendicular to the direction in which the recording head scans. Therefore, one carriage scan forms a band of an image area (band). The higher the scan speed is, the higher is the print speed. This is because data is usually printed based on the output pulses from a unit such as a linear scale sensor which is provided to detect the carriage position at a predetermined resolution (for example, 360 DPI) and because the frequency (head driving frequency or dot frequency) of the output pulses is determined according to the carriage scan speed.

An increase in print speed depends in part on whether or not the speed of the ink ejection from the ink jet head can keep up with an increase in print speed. If the head driving frequency is increased when the ink supply is insufficient, the print speed is increased but ink is not ejected properly with the result that some parts of the image cannot be printed. This significantly degrades the print quality.

To prevent this condition, there is a technology that reduces the head driving frequency (to the speed compatible with ink supply speed) only for a region within which the printing is performed and increases the head driving frequency only for non-print regions. However, to increase the print speed, it is preferable that the head driving speed is increased even in the print region.

It is another object of the present invention to provide an ink jet image forming device having a high-speed print mode that increases the head driving frequency even during printing in order to increase the print speed.

It is still another object of the present invention to provide a single-pass ink jet image forming device, wherein an interpreter in the ink jet image forming device thins out print dots, when forming fill patterns or thick-line shade patterns, to prevent ink dots from being ejected successively in the head scanning direction in order to allow ink to be sufficiently supplied even when the head driving speed is increased.

It is yet another object of the present invention to provide a single-pass ink jet image forming device capable of reducing the loss of thin lines in a thinning operation.

DISCLOSURE OF INVENTION

An image processing method according to the present invention is for use in an area gradation method that represents a halftone image with binary image data, comprising the steps of rearranging an N*N mask matrix, at least with respect to relatively low density, on a row and column basis, (N*N−1) times to generate (N*N−1) number of N*N mask matrices; combining the (N*N−1) number of N*N mask matrices with the original N*N mask matrix to form an (N*N)*(N*N) mask matrix; and generating binary halftone image from multi-level image data via the (N*N)*(N*N) mask matrix to prevent the halftone image from becoming all "0:OFF".

The halftone image is, for example, a halftone vector.

Even with a mask matrix for a low density image, the method according to the present invention reduces the problem of losing an entire vector of that density.

The image processing method may further comprise the steps of rearranging the (N*N)*(N*N) mask matrix on a row and column basis; and, via the resultant (N*N)*(N*N) mask matrix, generating binary halftone image from multi-level image data. This eliminates a regularity in the arrangement of ON dots in the (N*N)*(N*N) mask matrix, further reducing the problem of a vector being fully lost.

The image processing method may further comprise the step of checking if the binary image data obtained for a given halftone image via the N*N mask matrix for the density of the image becomes all "0:OFF", wherein, if the binary image becomes all "0:OFF", the (N*N)*(N*N) mask matrix is used. If all binary data is not "0:OFF", then the N*N mask matrix may be used for binarization as in the conventional method. When the conventional method is used, there is no need to generate the (N*N)*(N*N) mask matrix and therefore the memory capacity for storing the mask matrices is saved.

The present invention also provides the (N*N)*(N*N) mask matrix generated as described above.

The present invention also provides a device on which the method described above is embodied. The device comprises analysis means for analyzing image data including vector data and data for setting a vector density (shade), means for converting the vector data to raster data after the analysis using an area gradation method that represents a halftone image with binary image data, and output means for outputting the raster data, the image forming device comprising means for generating an N*N mask matrix by applying a density value of a given halftone image to a predetermined dither matrix as a result of the analysis of the analysis means; means for generating (N*N−1) number of N*N mask matrices by rearranging the N*N mask matrix, on a row and column basis, (N*N−1) times for a halftone image at least relatively low in density while maintaining the gray level of the N*N mask matrix and, at the same time, for combining the (N*N−1) number of N*N mask matrices with the original N*N mask matrix to form an (N*N)*(N*N) mask matrix; and means for.generating a binary halftone image from multi-level image data via the (N*N)*(N*N) mask matrix for the halftone image of at least relatively low in density.

This device may further comprise condition judging means for judging if the binary image obtained for a given halftone image via the N*N mask matrix for the density of the image becomes all "0:OFF", wherein, if the binary image becomes all "0:OFF", then the (N*N)*(N*N) mask matrix is used.

The condition judging means makes a judgement based on a gray (shade) value and a line width of the vector.

Alternatively, the condition judging means makes a judgement based on an inclination and/or the line length of the vector.

The means for generating the (N*N)*(N*N) mask matrix may further rearrange the generated (N*N)*(N*N) mask matrix on a row and column basis to generate a final (N*N)*(N*N) mask matrix.

Instead of using the means for generating the N*N mask matrix, non-volatile storage means may be provided for storing N*N mask matrices generated by that means for different densities. For example, (N*N+1) N*N matrices may be created as a table and stored in a non-volatile memory in advance, and the table may be used instead of forming an N*N matrix from the N*N dither matrix.

Alternatively, instead of using the means for generating the (N*N)*(N*N) mask matrix, non-volatile storage means may be provided for storing (N*N)*(N*N) mask matrices generated by that means for different densities. For example, (N*N+1) (N*N)*(N*N) matrices may be created as a table and stored in a non-volatile memory in advance, and the table may be used instead of forming an (N*N)*(N*N) matrix from the N*N matrix.

The use of these tables will increase the processing speed.

Another image forming device according to the present invention comprises analysis means for analyzing image data including vector data and data for setting a vector density (shade), means for converting the vector data to raster data after the analysis using an area gradation method that represents a halftone image with binary image data, and output means for outputting the raster data, the image forming device comprising means for generating (N*N−1) number of N*N dither matrices by rearranging an N*N dither matrix, on a row and column basis, (N*N−1) times and, at the same time, for combining the (N*N−1) number of N*N dither matrices with the original N*N dither matrix to form an (N*N)*(N*N) dither matrix; means for generating an (N*N)*(N*N) mask matrix by applying a given density value of a halftone image to the dither matrix as a result of the analysis of the analysis means; and means for generating a binary halftone image from multi-level image data via the (N*N)*(N*N) mask matrix. This device does not rearrange and enlarge the mask matrix obtained from the dither matrix but rearranges and enlarges the dither matrix per se. This device also gives the result similar to that described above.

In this case, instead of using the means for generating the (N*N)*(N*N) dither matrix, non-volatile storage means may be provided for storing (N*N)*(N*N) dither matrices pre-generated by that means.

An ink jet recording method according to the present invention is a method wherein a first print mode with a first print speed and a second print mode with a second print speed that is higher than the first print speed are provided, and wherein, in the second print mode, print dots are thinned out based on image data to be ink-jet recorded in such a way that the ink dots are not ejected successively and, an ink jet head is driven based on print dot data obtained after the thinning, while keeping a driving frequency of the ink jet head higher than that of the first print mode.

This method allows normal printing to be performed in the first print mode and, at the same time, high-speed printing to be performed in the second print mode without degrading print quality caused by ink ejection failures.

Preferably, the thinning operation is performed during the vector-to-raster data conversion after the analysis of the image data coded in a plotter description language. This allows software to perform the thinning operation more efficiently as compared with the method in which the thinning is performed on the image data expanded in the frame memory.

It is preferable that one dot is added to a line width of a vector if the line width of the vector is equal to or less than a predetermined number of dots. This prevents the vector from being fully lost due to the thinning operation.

An ink jet image forming device according to the present invention forms an image by ejecting ink dots on paper by an ink jet head that scans in a direction substantially perpendicular to a paper conveyance direction, the ink jet image forming device comprising means for setting a first print mode with a first print speed and a second print mode with a second print speed that is higher than the first print speed; means for receiving image data; print dot data creation means for creating print dot data to be supplied to the ink jet head based on the received image data; and head driving means for driving the ink jet head based on the print dot data; wherein, in the second print mode, the print dot data creation means thins out print dots based on the image data in such a way that the ink dots are not ejected successively in the head scan direction and, the ink jet head is driven based on the print dot data obtained after the thinning, while the head driving means makes a driving frequency of the ink jet head higher than that of the first print mode.

Preferably, the print dot data creation means comprises an interpreter that analyzes plotter description language data such as vector data and fill data and means for converting the data from vector data to raster data after the analysis made by the interpreter.

When a shade pattern for vector data or a mask pattern such as a fill pattern for polygon data is used, the print dot data creation means changes a mask pattern for the print dot data, which is not yet thinned, in such a way that the ink dots are not ejected successively in the head scan direction and the print dots are thinned using the changed mask pattern.

When image data is received directly, the print dot data creation means can perform a predetermined thinning for each unit of data of the print dot data, which is not yet thinned, in such a way that the ink dots are not ejected successively in the head scan direction.

The print dot data creation means include a table used to change the unit of data of input data to output data which has no ON dots successively occurring in the head scan direction. This table allows a data pattern that is input to the table to be changed quickly to a desired data pattern.

It is preferable that, when a line width of the vector in the received image data is equal to or less than a predetermined number of dots, the print dot data creation means adds one dot to the line width of the vector to create the print dot data.

BRIEF DESCRIPTION OF DRAWINGS

FIG. 5 is a diagram showing an 8*8 Bayer type dither matrix;

FIG. 6 is a diagram showing a mask matrix for density of 50% in the embodiment of the present invention;

FIG. 17 is a diagram showing simple rearrangement in the embodiment of the present invention;

FIG. 18 is a diagram showing the final form of rearrangement in the embodiment of the present invention;

FIG. 23 is a diagram showing a table of 8*8 mask matrices of 65 gray levels;

FIG. 24 is a diagram showing a table of 64*64 mask matrices of 65 gray levels in the embodiment of the present invention;

FIG. 25 is a diagram showing conditions for making the judgement as to the loss of vector data in the embodiment of the present invention;

FIG. 27 is a diagram showing conditions for making the judgement of the loss of an entire vector in the embodiment in FIG. 26;

FIG. 31 is a diagram showing a thinning table containing pre-set values for changing each shade pattern to a predetermined thinning pattern for each unit of data;

FIG. 32 is a diagram showing some examples of how data input to the thinning table in FIG. 31 is changed.

BEST MODE FOR CARRYING OUT THE INVENTION

Some embodiments of the present invention will now be described in detail with reference to the drawings. The embodiment uses an 8*8 matrix using Bayer type dither method such as the one shown in FIG. 5. In the description, an image forming device such as a plotter or a printer is used as an example of a device to which the present invention is applied.

Figure 1:
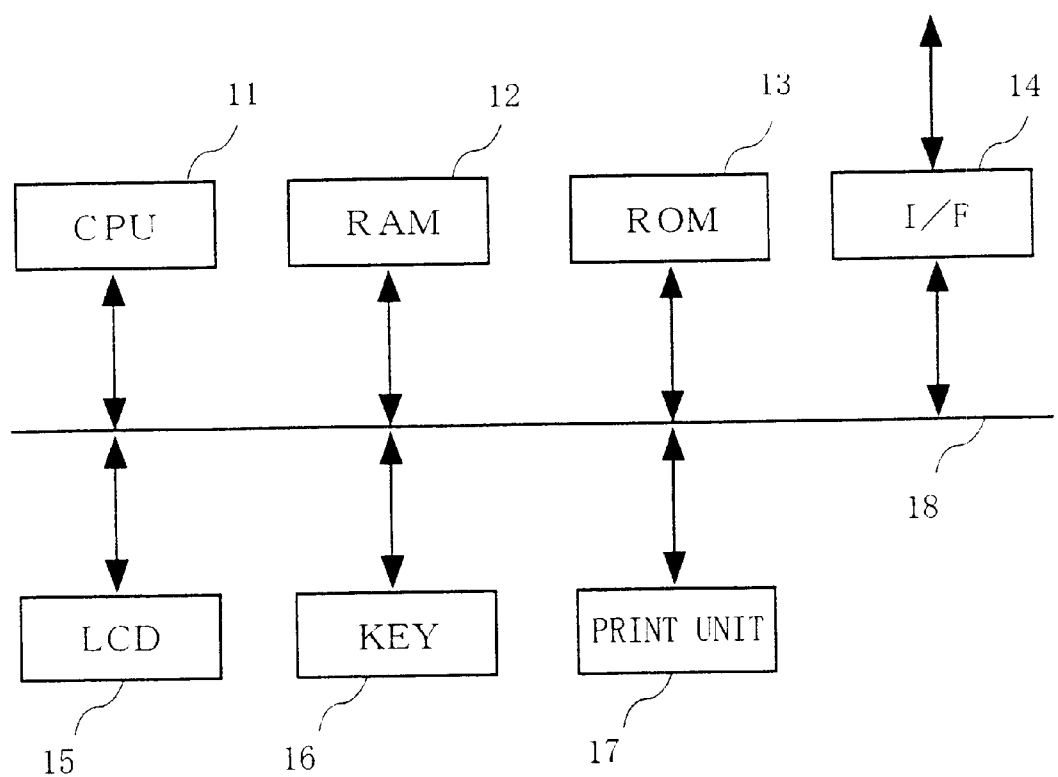
FIG. 1 is a block diagram showing the configuration of an image forming device in an embodiment of the present invention.

FIG. 1 is a block diagram showing the configuration of an image forming device in the embodiment. Referring to FIG. 1, numeral 11 indicates a CPU that controls the operation of the whole device, and numeral 12 indicates a RAM used as the work area for the CPU 11 and the temporary storage area of data. Numeral 13 indicates a ROM in which programs and data for driving the image forming device are stored. This ROM is used by the CPU 11. Numeral 14 indicates an interface via which the device connects to an external unit such as a computer terminal (not shown in the figure). Transferred via this interface is plotter description language data (image data) such as vector data and vector modification data. Numeral 15 indicates an LCD display that displays man-machine interface information, and numeral 16 indicates a key operation unit used to select the settings of the image forming device. Numeral 17 indicates a print unit of the image forming device, and numeral 18 indicates a system bus via which the CPU 11 and other elements are interconnected.

Figure 2:
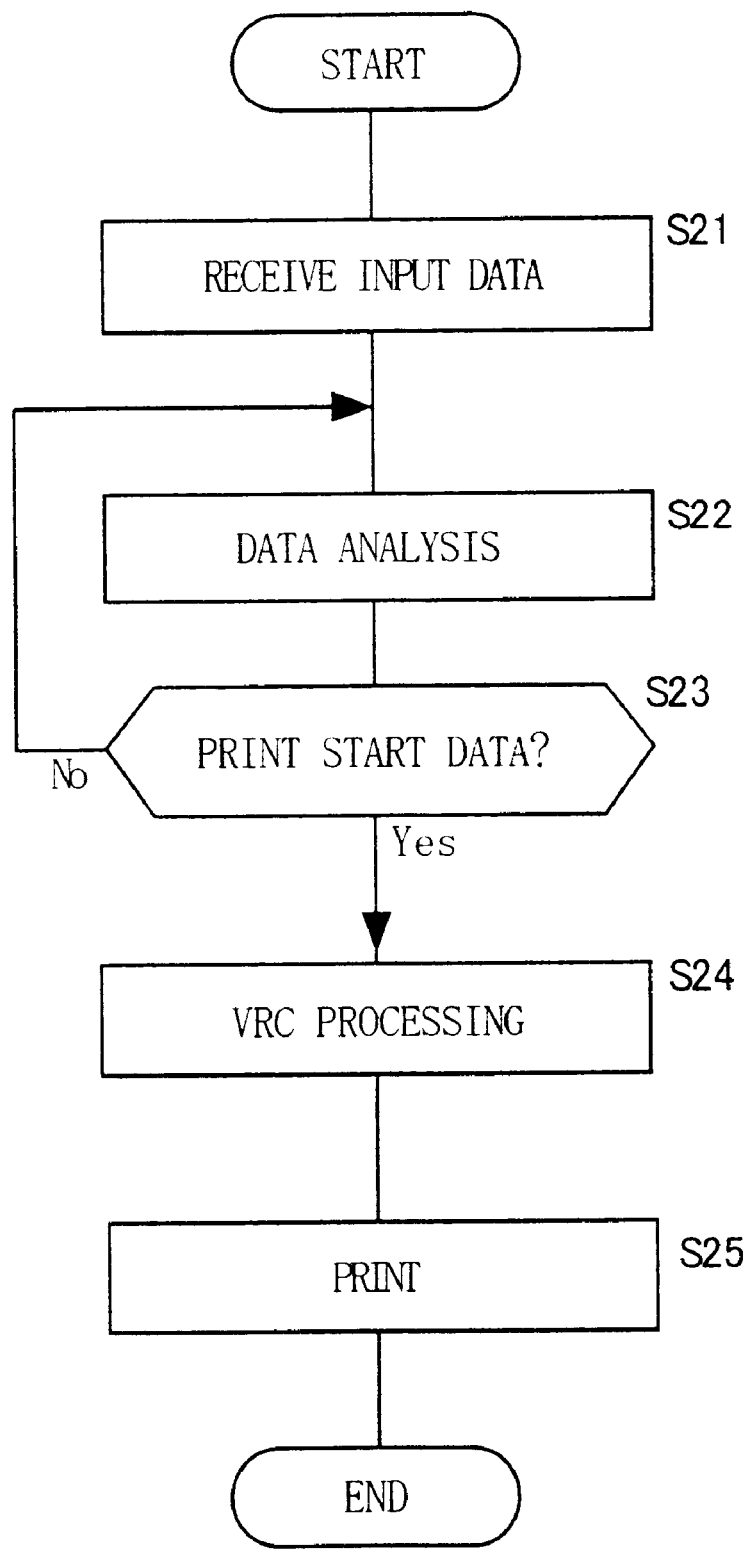
FIG. 2 is a flowchart showing a processing flow from the time the image forming device in FIG. 1 receives input data to the time the device prints the data.

FIG. 2 is a diagram showing the processing flow of the operation from the time when the image forming device shown in FIG. 1 receives data to the time when the device prints the data.

First, the image forming device receives input image data (vector data) from outside (S21) and analyzes the received data according to the plotter description language format (S22). This data analysis means is generally referred to as an interpreter. Data analysis continues till the end of the analysis of the print-start data, that is, the print-start command, included at the end of image data (S23). Upon receipt of the print start command, VRC (Vector-to-Raster Conversion) processing is performed in which vector data is converted to raster data (S24). During the VRC processing, data is expanded in the RAM 12 shown in FIG. 1 to a format suitable for printing. The actual print operation is performed (S25) by referring to the expanded data.

Figure 3:
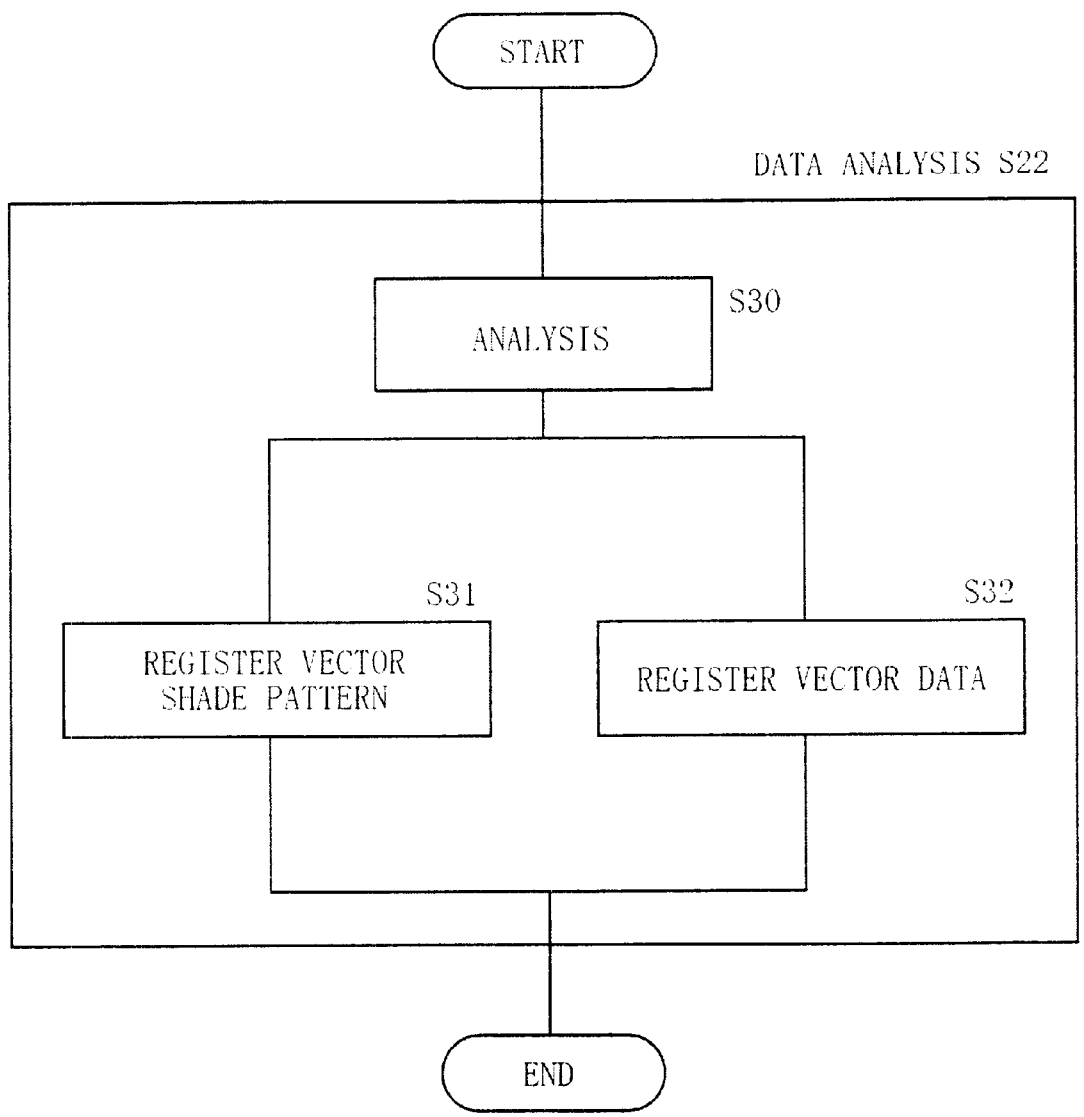
FIG. 3 is a diagram showing the output of data analysis in the flowchart in FIG. 2.

FIG. 3 is a diagram showing the output of data analysis processing S22. The output of data analysis (S30) includes starting-end and terminating-end point coordinate values, line width information, a vector connection shape, and end-point-edge shape of vectors which are required for the VRC processing. This vector data is stored in the RAM 12 shown in FIG. 1 (S32). The shade pattern that determines the density (or gray level) of a vector for rasterization is also stored in the RAM 12 in FIG. 1 (S31). This is the aforementioned mask matrix pattern to be referenced when vector data is rasterized. Because the mask matrix pattern size in this embodiment is 8*8, the mask matrix that is eight bytes in size is stored in the RAM 12. However, as will be described later, this mask matrix is changed to a 64*64 mask matrix in a special case.

Figure 4:
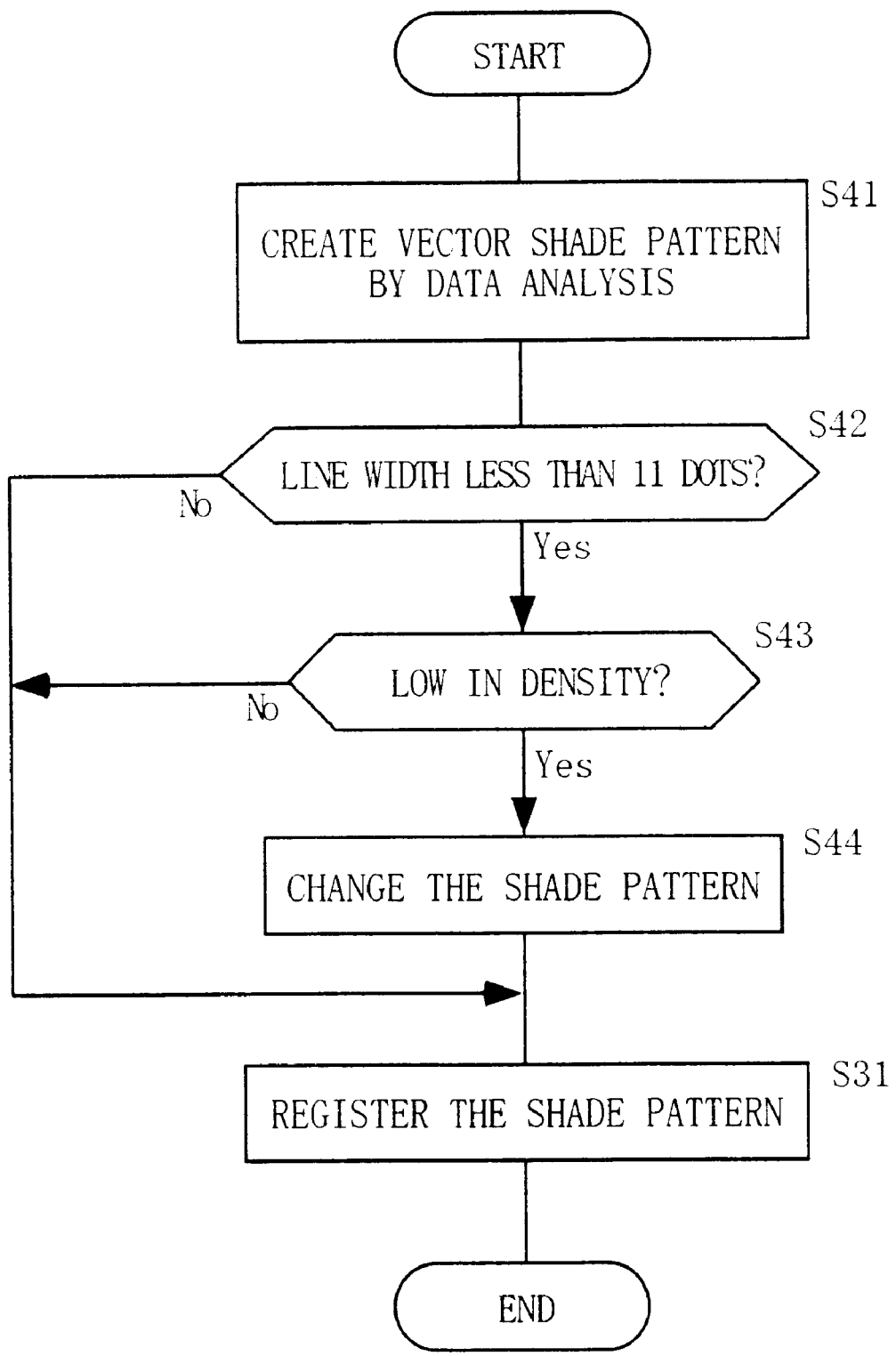
FIG. 4 is a flowchart showing the overview of processing for vector shade pattern registration in the embodiment in FIG. 3.

FIG. 4 is a flowchart showing the overview of the processing of this embodiment for registering the vector shade pattern described in FIG. 3. This processing is performed each time a vector is given.

First, a vector shade pattern is formed for vector data received as a result of data analysis (S41). As described above, a mask matrix corresponding to the vector density value is formed based on the 8*8 dither matrix shown in FIG. 5.

Then, to determine if the vector is a thin line, a check is made to see if the line width satisfies a predetermined condition (S42). It is desirable that the condition for the vector data line width be checked not with N dots but with N dots multiplied by $\sqrt{2}$. This is because, in an N*N mask matrix, the maximum distance between two adjacent ON dots in a non-zero, minimum gray level pattern is N multiplied by $\sqrt{2}$. Therefore, in this embodiment, not eight dots but 11 dots that is $\sqrt{2}$ times eight dots, are used as the condition. If the result is less than 11 dots, the vector is determined as a thin line. Another check is made as to whether the density is low (S43). The specific method will be described later. If the density is low, the already-created shade pattern is changed by the method that will be described later (S44). Then, this shade pattern is registered in the RAM 12 (S31).

In this way, a vector shade pattern is usually registered using an N*N matrix (stored in memory capacity). Only when it is found that a halftone image becomes all 0:OFF, an (N*N)*(N*N) matrix is registered. This requires less memory capacity. For example, for an 8*8 matrix, each mask matrix registration (storing into memory) requires eight bytes. On the other hand, for a 64*64 mask matrix, each registration requires 512 bytes.

In this embodiment in which an 8*8 mask matrix is basically used, the condition shown in FIG. 25 is used to judge if the density is low or not. Actually, the loss of an entire vector of a low density depends not only on the low gray level but also on the inclination angle of the vector. Therefore, in the description below, cases are classified into nine conditions as follows.

Figure 8:
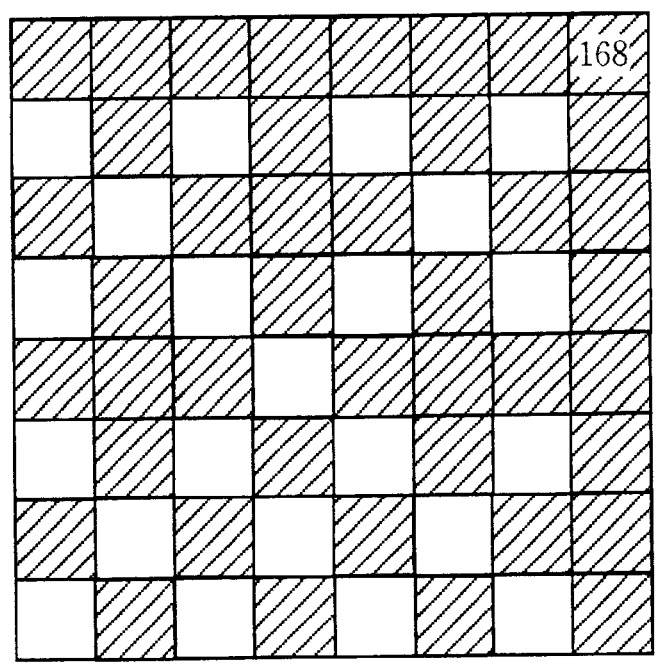
FIG. 8 is a diagram showing a mask matrix for density of 66% in the embodiment of the present invention.

The first condition "line is one dot thick and inclined at 45 degrees" corresponds to the case in which the absolute value of the x-coordinate increment of starting-end and terminating-end points of a given vector equals the absolute value of the y-coordinate increment of the end points. In this case, the lowest density mask matrix pattern that does not fully lose vector dots is the pattern shown in FIG. 8 whose density is 66%. At a lower density, all vector dots might fully be lost. Therefore, an action to be taken for the first condition is "change the shade pattern if the density is equal to or lower than 66%". The condition "equal to or lower than 66%" may be "lower than 66%" because there is no difference with the gray level of 66%. (The same applies to the other conditions).

Figure 7:
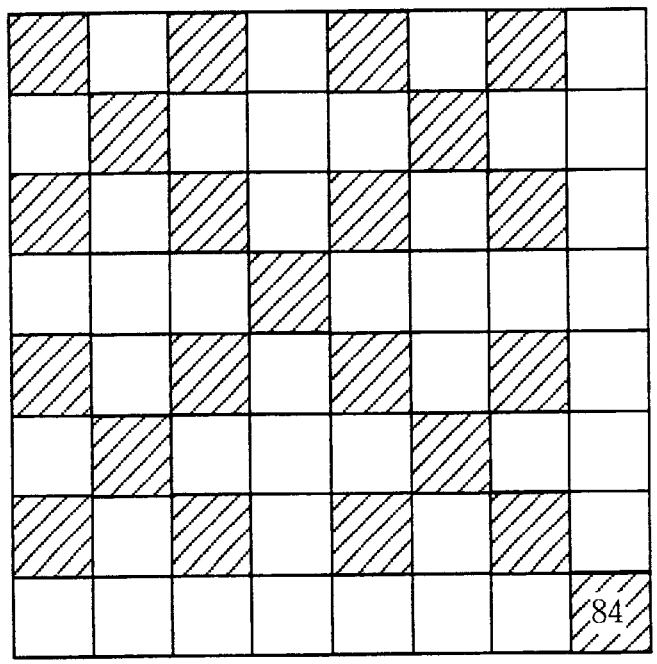
FIG. 7 is a diagram showing a mask matrix for density of 33% in the embodiment of the present invention.

The second condition corresponds to the case in which "line is one dot thick and inclined at degrees other than 45 degrees" (that is, the absolute value of the x-coordinate increment of the vector starting-end and terminating-end points does not equal the absolute value of the y-coordinate increment). In this case, the lowest density mask matrix pattern that does not fully lose vector dots is a pattern shown in FIG. 7 whose density is 33%. Therefore, an action to be taken for the second condition is "change the shade pattern if the density is equal to or lower than 33%".

Figure 10:
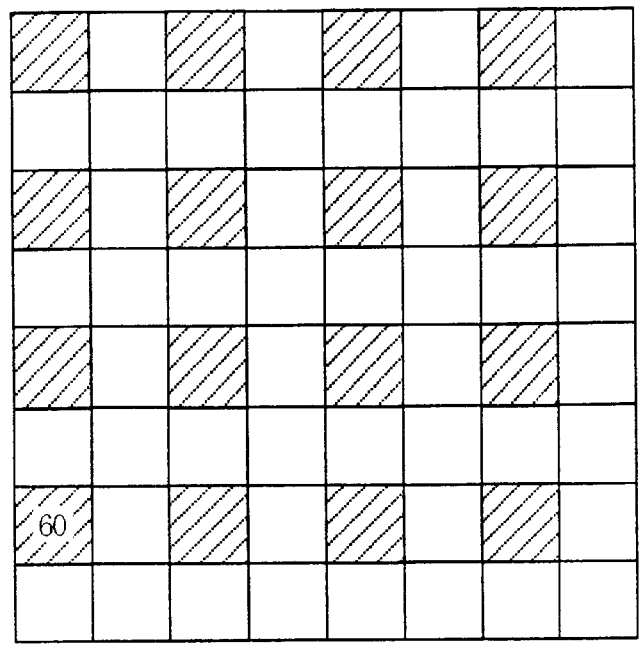
FIG. 10 is a diagram showing a mask matrix for density of 24% in the embodiment of the present invention.

The third condition "line is two dots thick and is not vertical" corresponds to the case in which the line is two dots thick and neither the x-coordinate increment nor the y-coordinate e increment of the starting and terminating-end points is 0. In this specification, the "vertical line" is referred to as a vector at the angle of 0 degrees or 90 degrees, including a horizontal line. Under the third condition, the lowest density mask matrix pattern that does not fully lose vector dots is a pattern shown in FIG. 10 whose density is 24%. Therefore, an action to be taken for.the third condition is "change the shade pattern if the density is equal to or lower than 24%".

Figure 9:
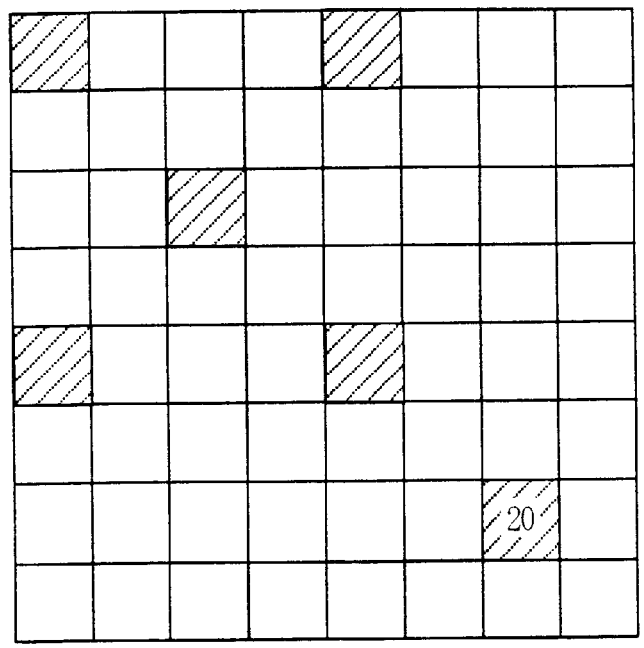
FIG. 9 is a diagram showing a mask matrix for density of 8% in the embodiment of the present invention.

The fourth condition corresponds to a "line is two dots thick and vertical". Under this condition, the lowest density mask matrix pattern that does not fully lose vector dots is a pattern shown in FIG. 9 whose density is 8%.

The fifth condition corresponds to a "line is three and four dots thick". Under this condition, the lowest density mask matrix pattern that does not fully lose vector dots is a pattern shown in FIG. 9 whose density is 8%.

Figure 11:
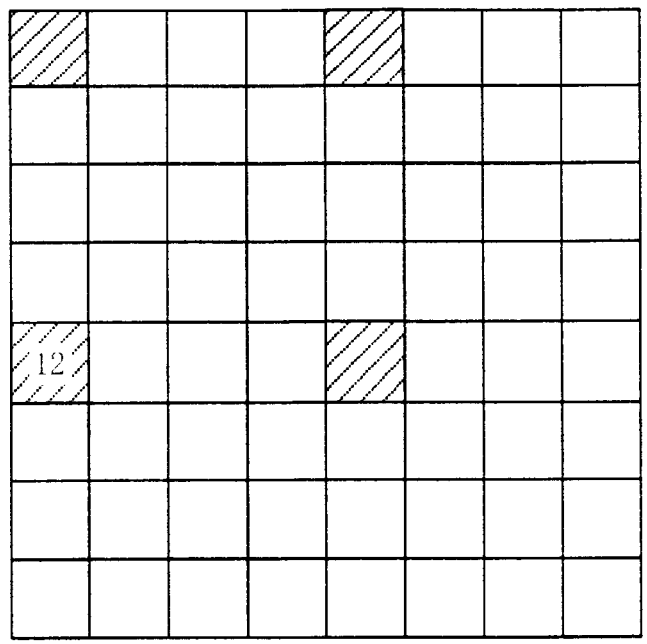
FIG. 11 is a diagram showing a mask matrix for density of 5% in the embodiment of the present invention.

The sixth condition corresponds to a "line is five dots thick". Under this condition, the lowest density mask matrix pattern that does not fully lose vector dots is a pattern shown in FIG. 11 whose density is 5%.

Figure 12:
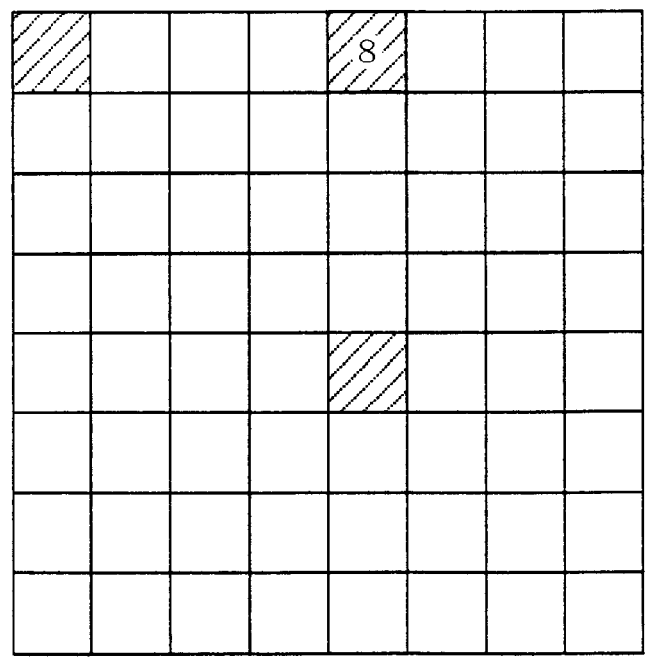
FIG. 12 is a diagram showing a mask matrix for density of 3% in the embodiment of the present invention.

The seventh condition corresponds to a "line is six, seven, eight, or nine dots thick". Under this condition, the lowest density mask matrix pattern that does not fully lose vector dots is a pattern shown in FIG. 12 whose density is 3%.

Figure 13:
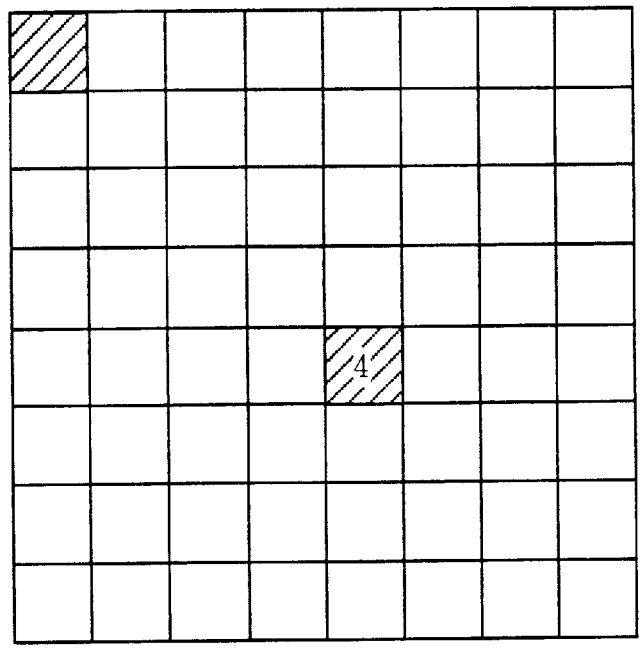
FIG. 13 is a diagram showing a mask matrix for density of 2% in the embodiment of the present invention.

The eighth condition corresponds to a "line is ten dots thick". Under this condition, the lowest density mask matrix pattern that does not fully lose vector dots is a pattern shown in FIG. 13 whose density is 2%.

The ninth condition corresponds to a "line is 11 dots thick or thicker". Under this condition, the shade pattern is not changed because there is no such need.

The possibility of the loss of a vector is judged as described above. Next, how to create an (N*N)*(N*N) matrix based on an N*N matrix will be described. This is performed by rearranging the rows and columns of the N*N matrix (N*N−1) times.

Figure 15:
FIG. 15 is a diagram showing how rows are rearranged in the embodiment of the present invention.
Figure 16:
FIG. 16 is a diagram showing how columns are rearranged in the embodiment of the present invention.

FIGS. 15 and 16 are diagrams describing the rearrangement. An example of program (coded in the C language) to rearrange rows and columns is given below. Comments are added to the major part of this program to describe its function. This program is simply an example of a matrix rearrangement program. As long as the same processing may be implemented, any programming language and its description may be used.

```
#define N_MATRIX 8
#define BYTE_DOT 8
extern unsigned char inputMatrix[N_MATRIX * N_MATRIX / BYTE_DOT];
extern unsigned char outputMatrix[N_MATRIX * N_MATRIX * N MATRIX * N_MATRIX / BYTE_DOT];
static void MakeMaskMatrix_ArrayConvert
( unsigned char *inputMatrix,
         unsigned char *outputMatrix ) {
char i, j, n ;
         for (i=0; i<N_MATRIX; ++i) { /*Create P1 in FIG. 17*/
              outputMatrix [i*N_MATRIX*N_MATRIX/BYTE_DOT]=inputMatrix [i];
         }
         for (j=0; j<N_MATRIX-1: ++j) {/* Create P2, P3, P4, P5, P6, P7, P8 in FIG. 17*/
              for (i=0; i<N_MATRIX; ++i) {
                   outputMatrix[(i*N_MATRIX)+(j+1)] = outputMatrix[(N_MATRIX-1-i)*N_MATRIX+j];
              }
}
for (n=0; n<N_MATRIX-1;++n) {
         for (i=0; i<N_MATRIX; ++i) {/* Create P9, P17, P25, P33, P41, P49, P57 in FIG. 17*/
              outputMatrix[i*N_MATRIX+(n+1)*N_MATRIX*N_MATRIX)]
              =outputMatrix[i*N_MATRIX+(n*N_MATRIX*N_MATRIX)]>>1)|
              (outputMatrix[i*N_MATRIX+(n*N_MATRIX*N_MATRIX]<<7);
}
for (j=0; j<N_MATRIX-1; ++j) {/* Create remaining P's in FIG. 17*/
         for (i=0; i<N_MATRIX; ++i) {
              outputMatrix[(i*N_MATRIX)+(j+1)+((n+1)*N_MATRIX*N_MATRIX)]
              =outputMatrix[(N_MATRIX-1-i)*N_MATRIX+j+((n+1)*N_MATRIX*N_MATRIX)];
              }
```

-continued

```
        }
      }
}
```

Figure 14:
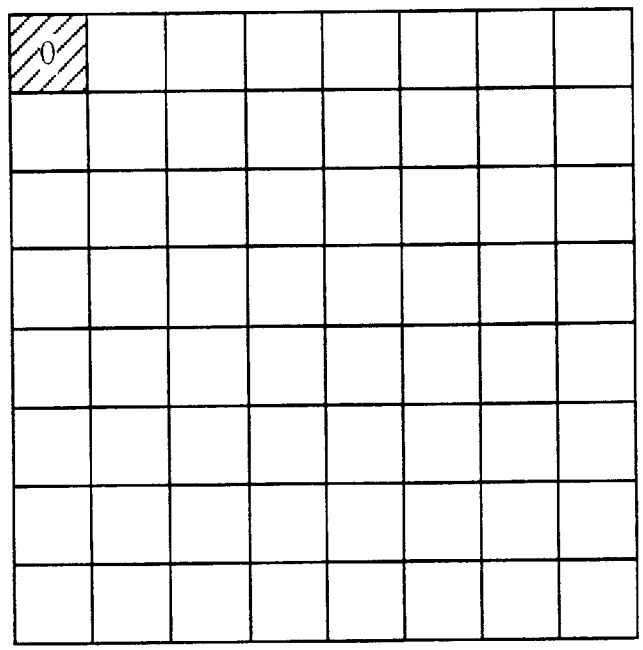
FIG. 14 is a diagram showing a mask matrix for density of lower than 2% in the embodiment of the present invention.
Figure 19:
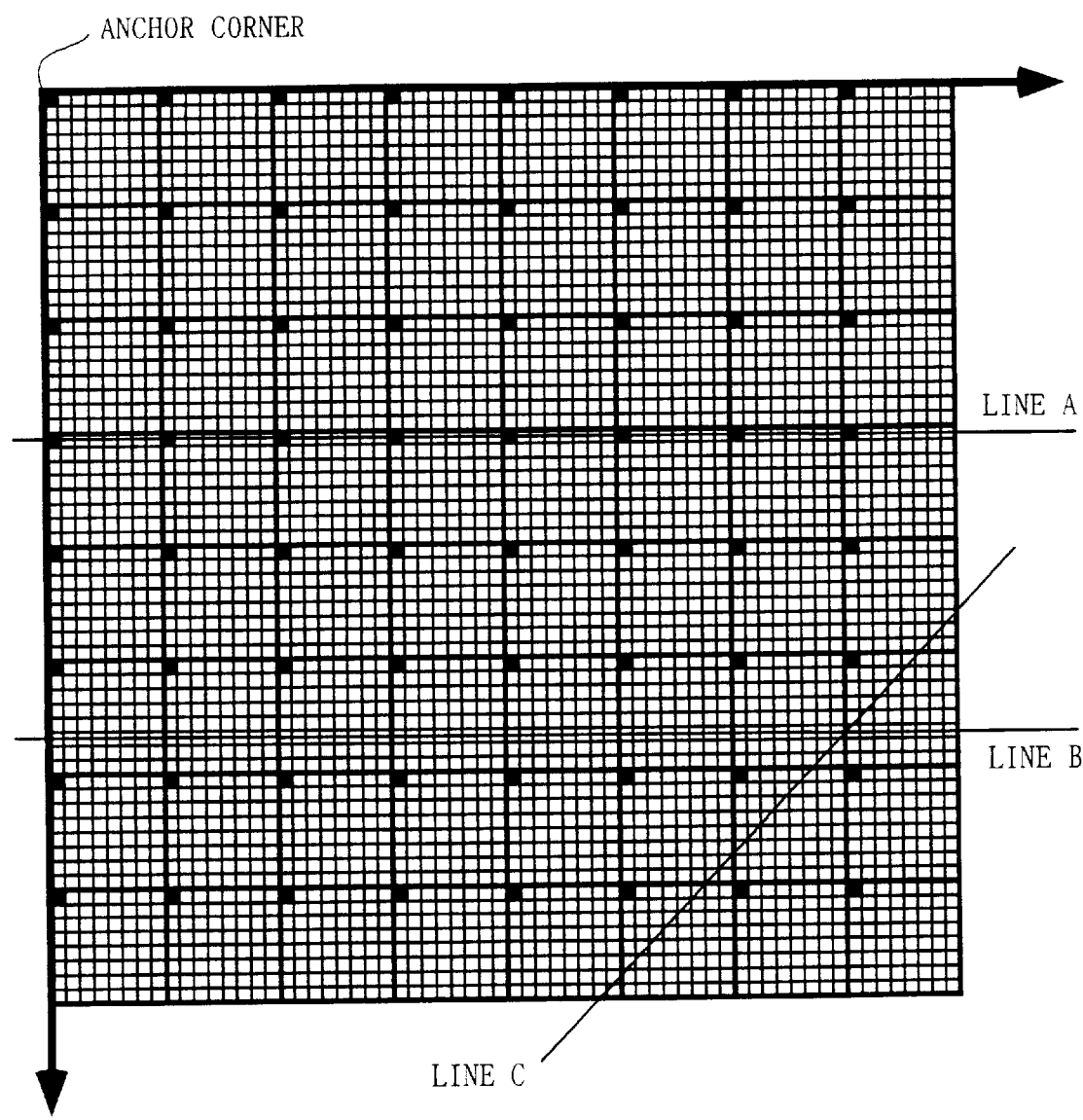
FIG. 19 is a diagram showing a normal tiling of mask matrices for density of lower than 2%.
Figure 20:
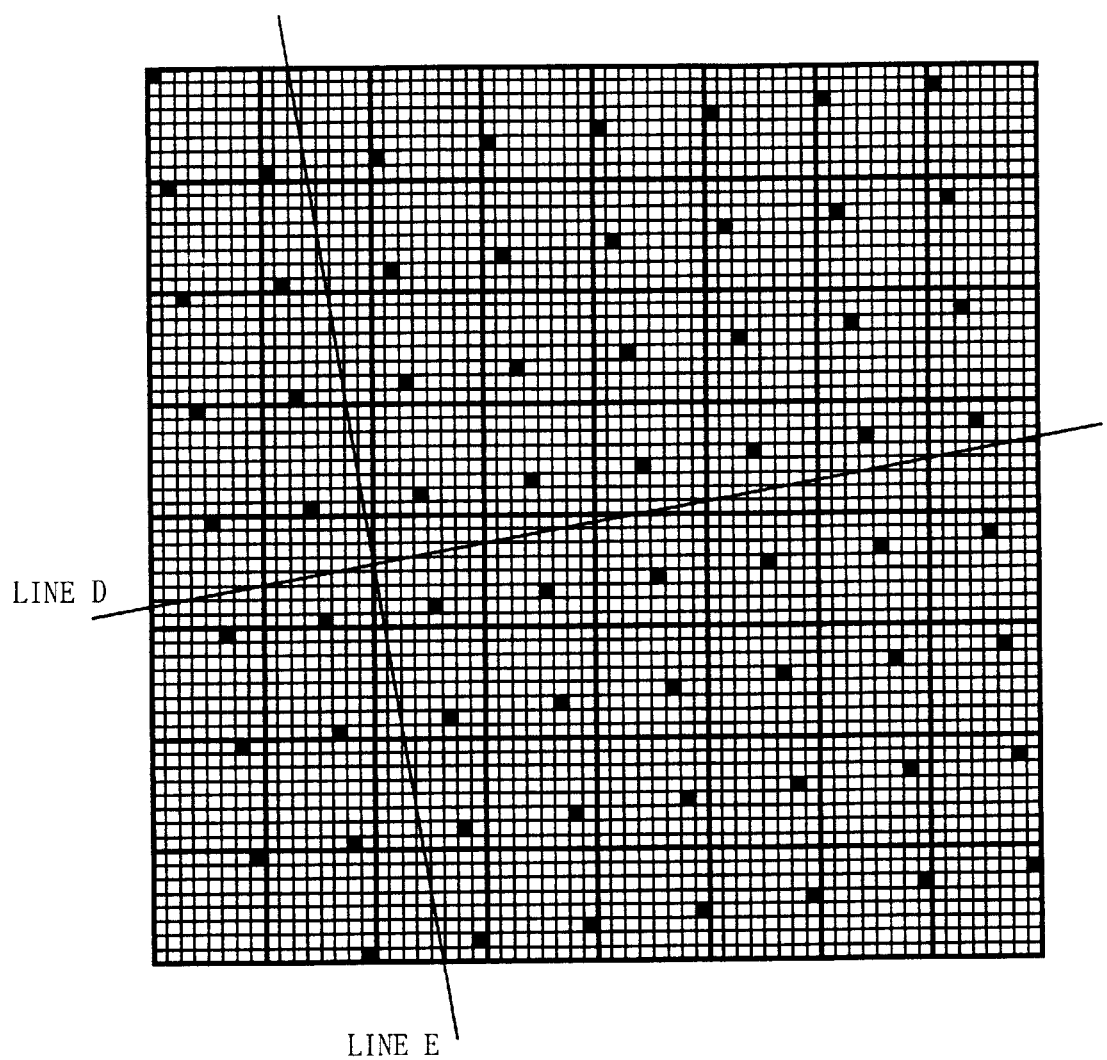
FIG. 20 is a diagram showing the mask matrices that are subject to the simple rearrangement for density of lower than 2%, in the embodiment of the present invention.

As described above, FIG. 14 shows a mask matrix for density of lower than 2%, and FIG. 19 shows a pattern created by tiling the mask matrices. This mask matrix would lose a lot of vectors. FIG. 20 shows a result of a 64*64 mask matrix created by applying the program described above to the 8*8 mask matrix shown in FIG. 14. The resultant mask matrix pattern significantly increases thin line reproducibility, as compared with the pattern shown in FIG. 19.

Pattern P1 shown in FIG. 17 is an 8*8 mask matrix used as the base pattern of rearrangement. P2 is a mask matrix created by moving the top row of P1 to the bottom row position as shown in FIG. 15. P3 is created by making the same row rearrangement to P2. In the same manner, the mask matrices up to P8 are created. P9 is created by moving the rightmost column of P1 to the leftmost column position as shown in FIG. 16. P10 is created by making the same column rearrangement to P2. In the same manner, the mask matrices up to P16 are created. In addition, patterns P17–P24 in the next pattern row are created by making the rearrangement similarly for the patterns in the preceding pattern row. The same processing is performed for the pattern rows that follow.

In this way, based on P1 which is an N*N mask matrix, the (N*N)*(N*N) mask matrix such as the one shown in FIG. 17 can be created. As was described above, the 64*64 mask matrix shown in FIG. 20 is created in the same manner based on the 8*8 mask matrix for that density value less than 2% shown in FIG. 14. Although the thin-line reproducibility of the mask matrix pattern shown in FIG. 20 is much better than that of the mask matrix pattern shown in FIG. 19, this mask matrix pattern might also fully lose vectors with particular angles such as lines D and E as shown in FIG. 20.

FIG. 18 is a diagram used to describe the rearrangement that takes into consideration the case in which vectors with particular angles, such as those shown in FIG. 20, are fully lost. The mask matrix shown in FIG. 18 is created by making another matrix rearrangement for the (N*N)*(N*N) mask matrix shown in FIG. 17 which is created by making the above-described rearrangement. This eliminates the ON-dot regularity that is found in the mask matrix pattern shown in FIG. 20.

Figure 21:
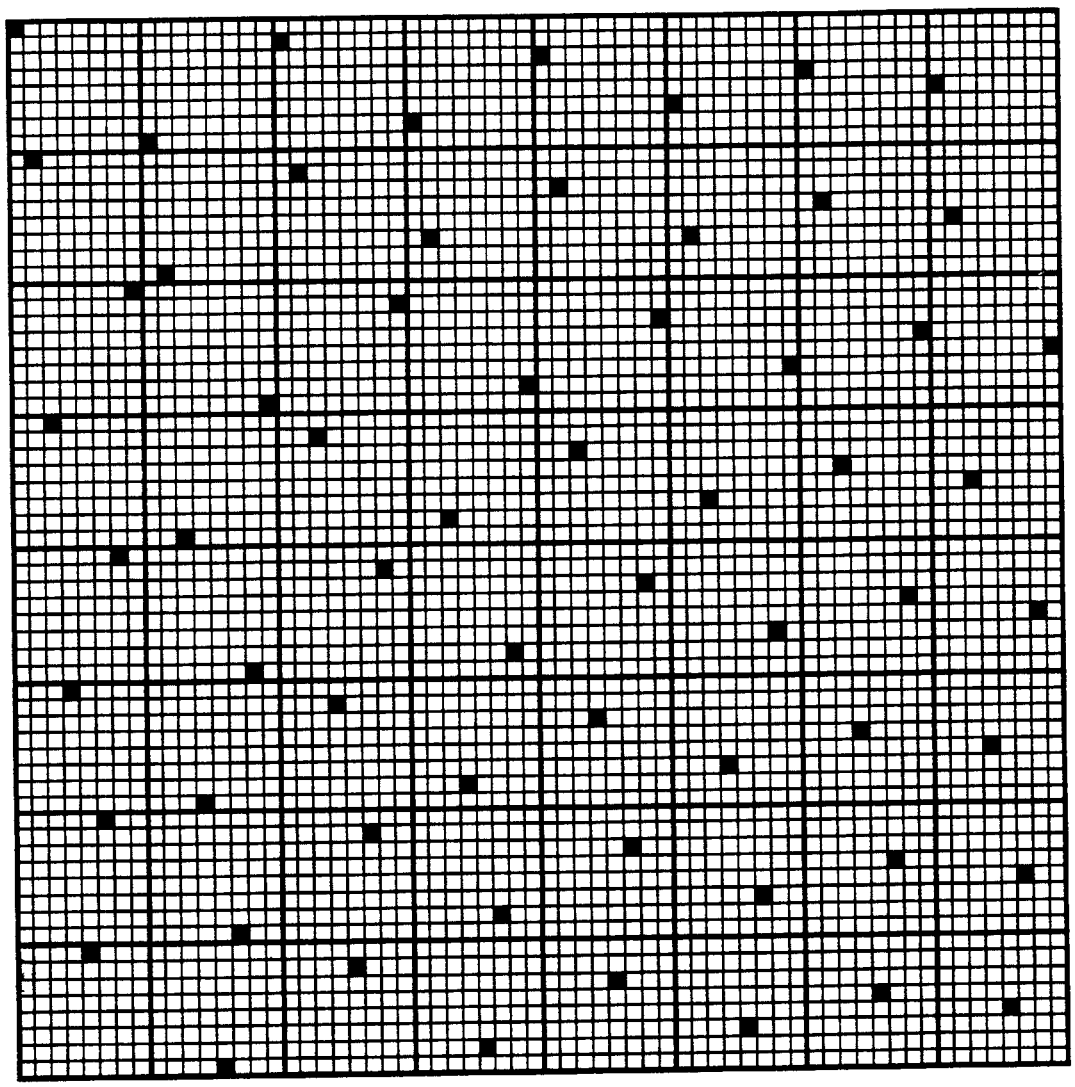
FIG. 21 is a diagram showing the final form of the mask matrices that have been rearranged for density of lower than 2%, in the embodiment of the present invention.

As to FIG. 18, how to eliminate the regularity will be described. The regularity is eliminated by changing the arrangement of an M*M (where, M=8) mask matrix composed of elements (Px), each element of which is an N*N (where, N=8) mask matrix, is changed. In this embodiment, the contents of the eighth row of the M*M matrix are moved to the third row, and the contents of the original third row are moved to the fourth row. Similarly, the contents of the original fourth row are moved to the sixth row, the contents of the original sixth row to the seventh row, the contents of the original seventh row to the fifth row, and the contents of the original fifth row to the eighth row. In this way, the rows of the M*M mask matrix are rearranged. Next, the same rearrangement is made for the columns of the M*M mask matrix. These operations generate a new M*M mask matrix such as the one shown in FIG. 18. This mask matrix corresponds to the example shown in FIG. 21. As compared with the mask matrix shown in FIG. 20, the mask matrix shown in FIG. 21 shows no regularity in ON-dot arrangement. This irregularity prevents vectors with any inclination from being fully lost. Any other method for eliminating regularity may be used.

As described above, it is possible to make high-resolution halftone representation the by generation of the rearrangement shown in FIG. 17 by means of the above-described program, in conjunction with the mask matrix generating means for rearranging the rows and columns of the M*M array.

The N*N mask matrix in this embodiment, an 8*8 mask matrix, makes available representation with 65 gray levels.

In the above description, a mask matrix is generated for each vector data rasterization. It is also possible that 65 mask matrices are prepared in advance.

FIG. 23 shows a table containing 8*8 mask matrices of 65 gray levels. The 65 gray levels of the 64*64 mask matrix shown in FIG. 21, which is an example of an (N*N)*(N*N) mask matrix, may also be stored in a table. An example of this table is shown in FIG. 24. In the figure, 0x indicates a hexadecimal number. Pre-storing this table in the ROM 13 provided as non-volatile storage means shown in FIG. 1 reduces the memory capacity required in the RAM 12 and, moreover, eliminates the need for the program described above and therefore enhances the processing speed. While the line width was mentioned in the above description, all dots of a short vector may also be fully lost. To solve this problem, step S42 in the flowchart in FIG. 26 considers not only the line width but also the line length. That is, a check is made to see if either the line width or the line length is less than 11 dots. In addition, in step S43 that follows, the "low density" condition is added. The reset of processing is the same as that in FIG. 4.

Figure 26:
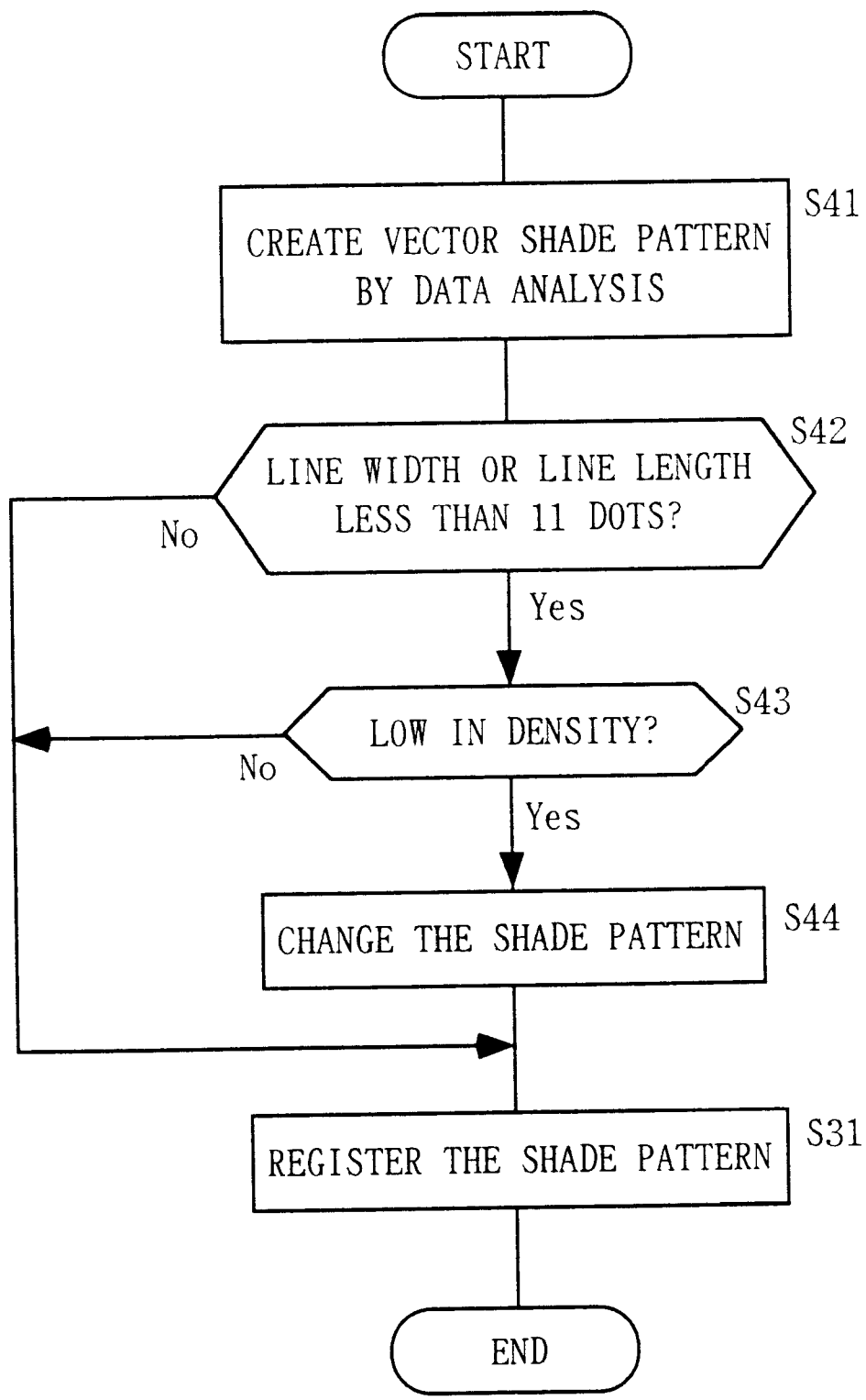
FIG. 26 is a flowchart showing the overview of processing for vector shade pattern registration in another embodiment of the present invention.

FIG. 27 shows an example of "low density" conditions corresponding to step S42 in FIG. 26. As compared with the conditions shown in FIG. 25, line length conditions 3, 6, 8, and 10 are added and "line length" is added to the condition part for conditions 11–13. The action for conditions 3, 6, 8, and 10 are the same as those for conditions 2, 5, 7, and 9, respectively.

Although the preferred embodiment of the present invention has been described above, various modifications can be made.

For example, although matrix rearrangement is made for a mask matrix generated based on the dither matrix in the above description, the rows and columns of the dither matrix per se may be rearranged. That is, rearranging the N*N dither matrix, on a row and column basis, (N*N–1) times generates (N*N–1) number of N*N dither matrices and, at the same time, generates a (N*N)*(N*N) dither matrix by combining the (N*N–1) number of N*N dither matrices with the original N*N dither matrix. In addition, instead of using means for generating the (N*N)*(N*N) dither matrix, non-volatile storage means (for example, ROM) for storing the (N*N)*(N*N) dither matrices, generated by that means in advance, may be provided. Furthermore, as a modification, the present invention may be applied to the fill processing of non-vector data. Performing the same processing for filling an area, where an image area to be filled is smaller than the mask matrix of a fill pattern N*N, prevents the fill image from fully being lost.

According to the embodiment described above, rearranging the mask matrix and creating the (N*N)*(N*N) mask matrix from the N*N mask matrix increase vector data reproducibility when the vector data reproducibility of the area gradation method for representing a halftone image is bad at a low gray level.

Next, another embodiment of the present invention will be described in detail with reference to additional drawings. The configuration of an image forming device in this embodiment is the same as that shown in FIG. 1. In particular, the print unit 17 includes an ink jet head for ink jet recording. In this embodiment, the ink jet head in the print unit 17 has 160 black-ink nozzles from which ink droplets are ejected corresponding to rasterized image data which has been converted from vector. The 160 nozzles are arranged in the direction substantially perpendicular to the head scan direction.

Figure 28:
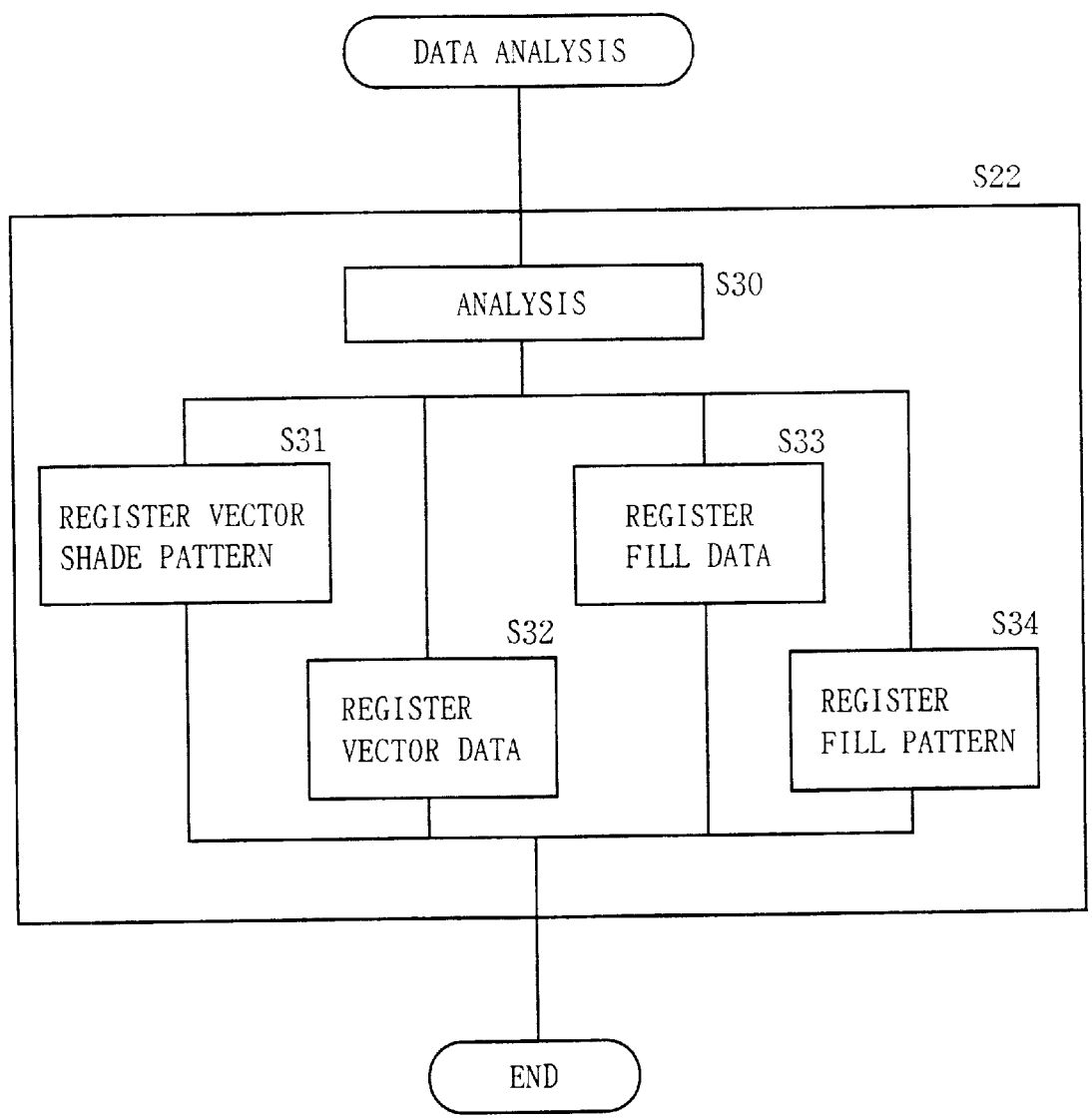
FIG. 28 is a diagram showing the output of data analysis processing S22 in FIG. 2.

The flow of processing in this embodiment from the time input data is received to the time it is printed is the same as that shown in FIG. 2. One band of print data for recording by the ink jet head is prepared during vector-raster conversion (VRC) processing and then the actual print operation is started (S25). The VRC processing and print operation are repeated for each band. FIG. 28 is a diagram describing the output of data analysis (S22 in FIG. 2) in this embodiment.

The major output of data analysis includes information on the vector starting-end and terminating-end point coordinates, line width, vector connection shape, and endpoint-edge shape for use in the VRC processing. The vector data is stored temporarily in the RAM 12 (S32). A vector shade pattern for rasterization is also registered (S31). This is a mask pattern to be referenced during vector data rasterization. A shade pattern is created, for example, by referencing the dither pattern for each given vector density.

The coordinates of fill (polygon) data are also registered (S33). Corresponding to this data, a fill pattern for rasterization is also registered (S34). A fill pattern, which is also a mask pattern, may be selected from a plurality of standard patterns prepared in advance.

Figure 29:
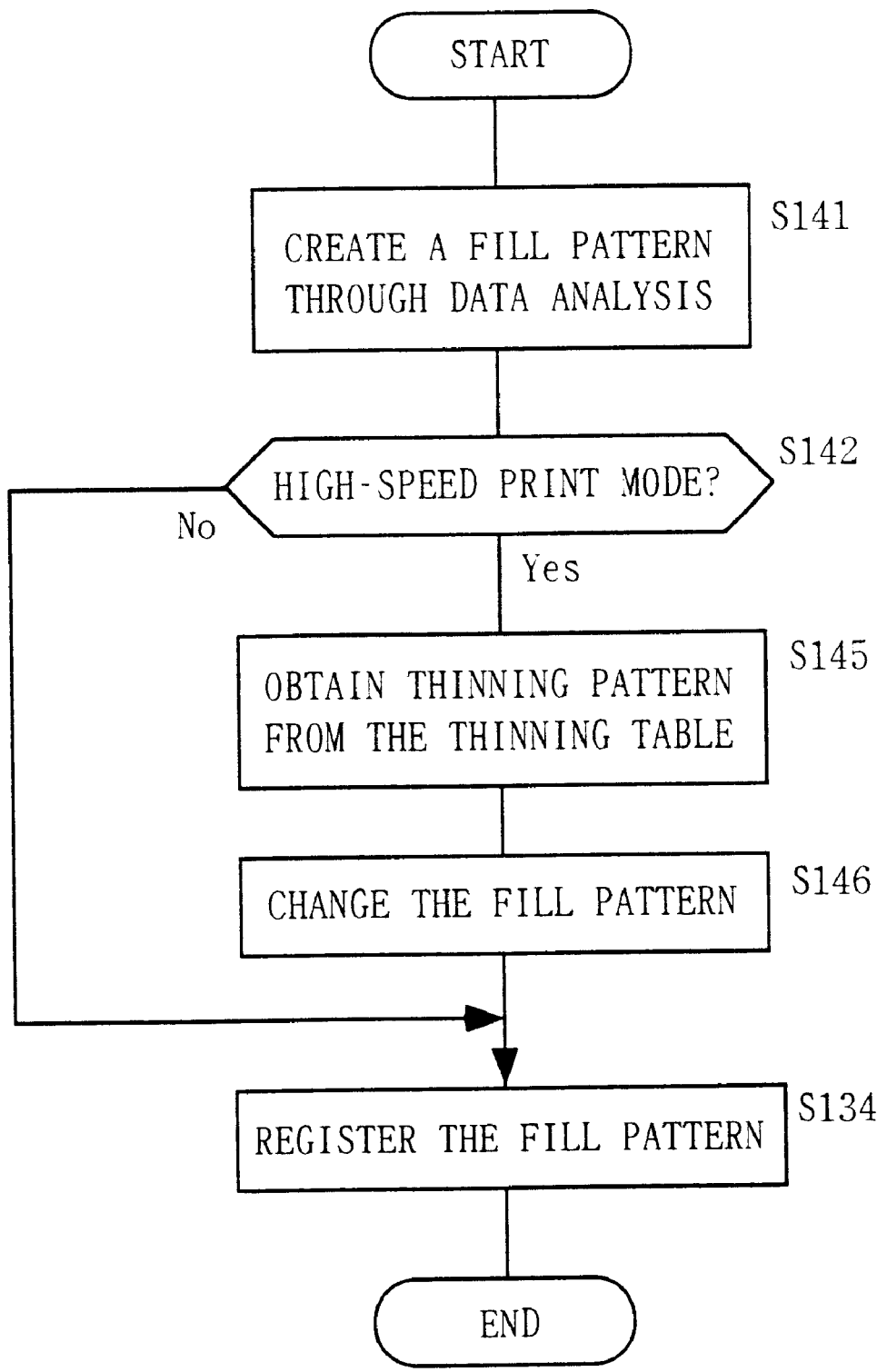
FIG. 29 is a flowchart showing a specific processing procedure for fill pattern registration processing S34 in FIG. 28.

FIG. 29 is a flowchart showing the procedure for the fill pattern registration processing S34 in FIG. 28. In this example, a fill pattern is first formed based on the result of data analysis (S141). Then, a check is made to see if the high-speed print mode is set (S142). The high-speed print mode, a mode in which the carriage movement speed (and a head driving frequency) during printing is higher than that in the normal print mode, is specified by the user through the key operation unit 16 or from an upper computer terminal via the interface 14.

If it is recognized that the high-speed print mode is set, the print dots are actually thinned out. To do so, a corresponding thinning pattern is obtained from the predetermined thinning table (described later) (S145) to change the fill pattern obtained in S141 (S146). That is, ON dots are thinned out so as to prevent successive ON dots from being generated in the head scan direction. An example of the configuration of the thinning table will be described later. Then, the fill pattern is registered (stored in the RAM 12) for use in the subsequent VRC processing (S134). This registered fill pattern will be used in the subsequent VRC processing.

Figure 30:
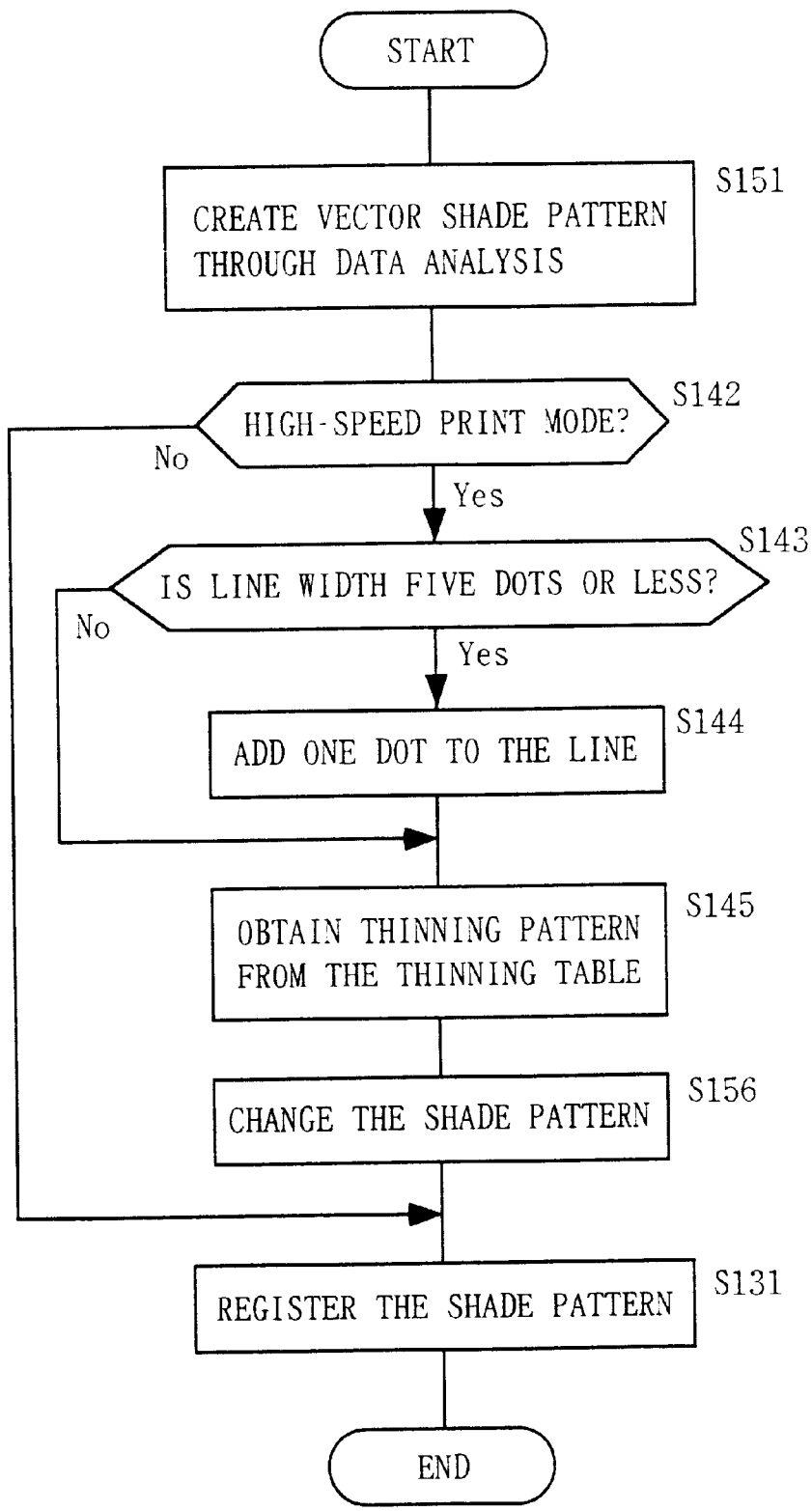
FIG. 30 is a flowchart showing a specific processing procedure for vector shade pattern registration processing S31 in FIG. 28.

FIG. 30 is a flowchart showing the processing procedure for the vector shade pattern registration processing S31 in FIG. 28.

In this example, a vector shade pattern is first formed based on the result of data analysis (S151) and then a check is made to see if the high-speed print mode is set (S142). If the high-speed print mode is not set, control is passed to the shade pattern registration processing in step S131. If the high-speed print mode is set, a check is made to see if the line width of the vector is equal to less than a predetermined number of dots (in this case, five dots) (S143). If the number of dots of the line is larger than the predetermined number of dots, control is passed to step S145. If number of dots of the line is equal to or less than the predetermined number of dots, one dot is added to the vector data to thicken the line (S144). This processing is performed to avoid the loss of full vector although, when the vector is thin, there is a possibility that all vector data dots would be fully lost.

Next, like the processing in FIG. 29, a thinning pattern is obtained from the thinning table (S145) to change the vector shade pattern (S156). Then, the vector shade pattern is registered for use in the VRC (S131).

Figure 22:
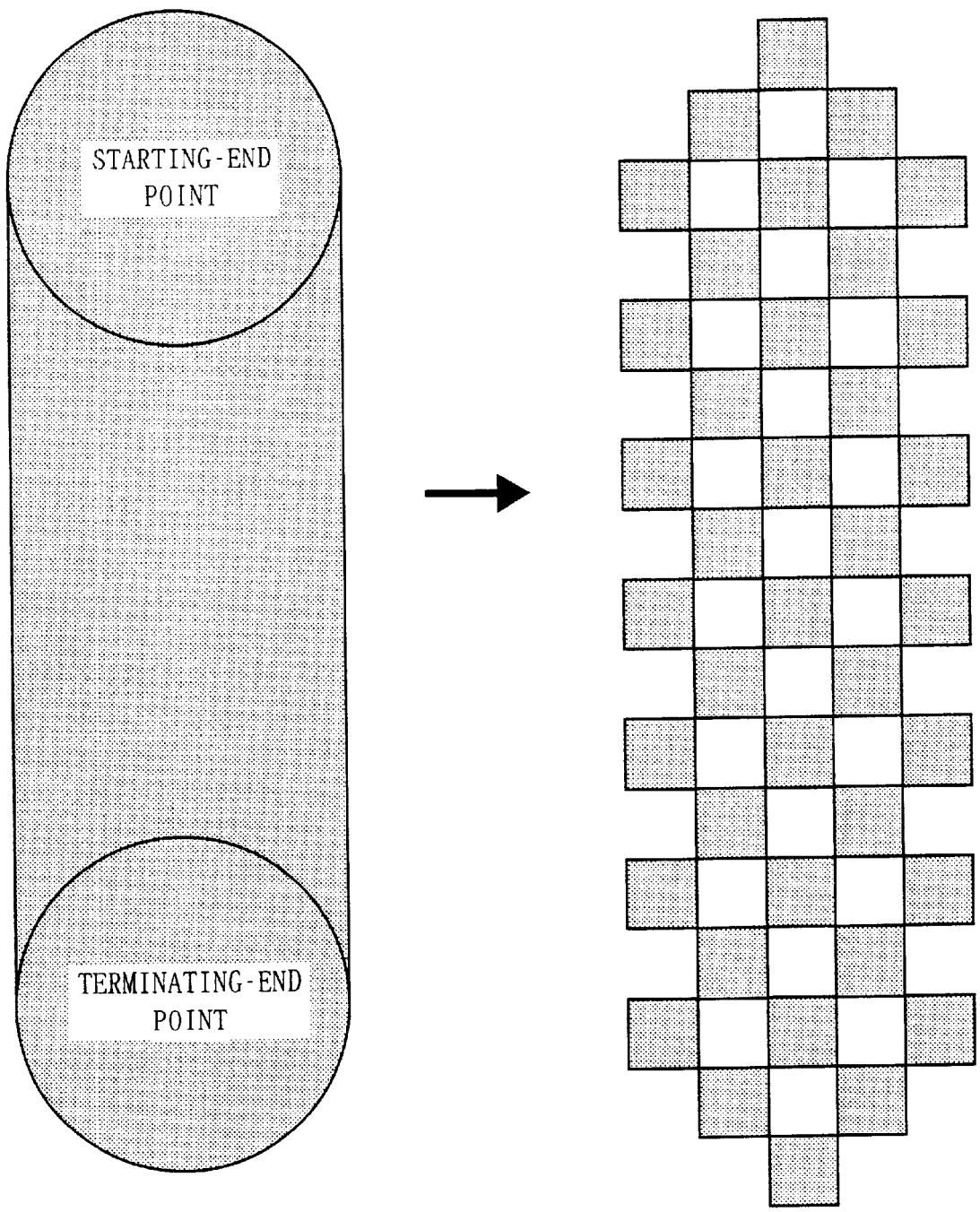
FIG. 22 is a diagram showing representation of vector data for density of 50%.

The result produced by applying the shade pattern to vector data is the same as the one shown in FIG. 22. The data to the left of the arrow in the figure is the vector image of a plurality of rasters (all dots ON) obtained by the VRC processing. The result produced by applying the shade pattern to this vector data is shown to the right of the arrow. In this example, the application of the shade pattern corresponds to overlaying the vector image onto a tiled pattern of the 8×8 matrix to calculate the logical product (AND) of both data. (The application of the fill pattern is performed in the same manner). Therefore, the shade pattern is also a sort of thinning patterns. In the example in FIG. 22, the thinning pattern is the one produced by thinning out every other ON dot. However, depending upon the shade pattern, a plurality of ON dots may occur successively. The thinning table in this embodiment is provided to change the shade pattern so that a plurality of ON dots do not occur successively in the head scan direction. This also applies to the fill pattern.

FIG. 31 is a diagram showing a pre-set thinning table 28 which is used in this embodiment to change a shade pattern to a predetermined thinning pattern on a unit-of-data basis.

This thinning table 28 is configured so that no successive dots are formed in the head scan direction when the table is applied to a shade pattern (or a fill pattern) or directly to image data. In this example, an 8×8 input pattern is assumed. This pattern is represented by 8-byte data. The table contains a table output data pattern that prevents successive ON dots from being generated in response to one-byte data (0–255) that is input to the table. The vertical axis of the table in the figure represents the numeric value of the high-order digit of a 2-digit hexadecimal number, while the horizontal axis represents the numeric value of the low-order digit. The numeric value in each cell represents a 2-digit hexadecimal number that is output in response to a given input hexadecimal number. For example, as shown in FIG. 32(*a*), the thinning table 28 indicates that the input data of 0x03 (00000011 in binary) is changed to the output data of 0x05 (00000101 in binary) (where, 0x indicates that the numeric value that follows is a hexadecimal number). Similarly, 0x26 (00100110) is changed to 0x25 (00100101) (FIG. 32(*b*)), and 0x99 (10011001) is changed to 0x55 (01010101) (FIG. 32(*c*)). In this way, in response to table input data that can be dealt with by the dot position change, the positions are changed without reducing the number of "1"s. This is not to change the print density even in the high-speed print mode. The same method is used for FIG. 32(*e*). Although there is only one ON dot but no successive "1"s in the input data shown in FIG. 32(*d*), the input data is changed. This is to store the value of "0" in one end position: (leading end in this case) of the output data. That is, this method eliminates the possibility that successive "1"s occur in the boundary between neighboring two pieces of one-byte data. When five or more "1"s occur as in FIG. 32(f), the number of "1"s is reduced because it cannot be dealt with by shifting "1".

Repeatedly changing an 8×8 shade pattern eight times, one horizontal byte at a time, generates a changed 8×8 shade pattern. This corresponds to the shade pattern change processing in step S156 in FIG. 30.

Figures 33A, 33B:
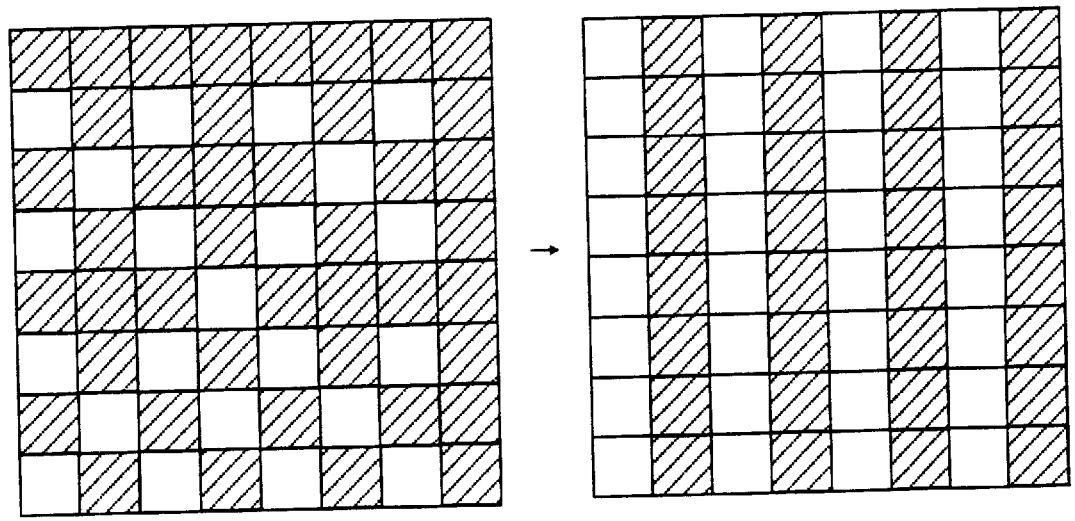
FIGS. 33(a) and (b) are a diagram showing a particular shade pattern and another shade pattern generated by changing it by the thinning pattern shown in FIG. 31, both of which are represented by 8×8 matrix values, and showing the dot matrices corresponding to both patterns.

FIG. 33(a) shows a particular shade pattern and the changed shade pattern generated by applying the thinning pattern shown in FIG. 31 to that particular shade pattern, both of which are represented by 8×8 matrix numeric values. FIG. 33(b) shows the dot matrices corresponding to the both patterns. The FIG. 15 indicates that the successive ON dots ("1") included in the original shade pattern are not found in the changed shade pattern. Image data, once processed by, and output from, this shade pattern has no successive ON dots in the head scan direction. Therefore, ink may be correctly ejected keeping up with the speed even when the head driving frequency is two times higher than that of the normal mode.

It would also be possible to eliminate successive ON dots after vector data is expanded into image data in the frame memory, by the VRC processing. However, doing this processing by a software program involves bit-by-bit retrieval which would take a lot of time. On the other hand, doing this processing by a hardware unit would result in an added cost and therefore impractical on a commercial ink jet image forming device. Thus, it is preferable that dots be thinned out before vector data expansion (that is, in the interpreter) as described above.

Although the preferred embodiments of the present invention have been described above, various modifications can be made.

For example, a modification of the present invention provides a decompression processor (interpreter) that decompresses run-length or pack-bits compression data received not as vector data but as image data. In this case, it is also possible to thin out data using the table shown in FIG. 31 when the decompression processor recognizes that ink ejection occurs successively. There is neither a shade pattern nor a fill pattern for this image data that is received, but a thinning pattern is applied directly to decompressed image data. The decompression processor performs this processing because it is easy to determine whether or not ON dots occurs successively in run-length or pack-bits compression data.

According to this embodiment, a single-pass ink jet image forming device thins out dots before printing to prevent ink ejection from occurring successively in the head scan direction and allows ink to be supplied properly in time even when the head driving frequency is increased. This enhances the print speed without ink ejection failure.

In addition, the interpreter thins out ink dots and, therefore, the ink jet image forming device performs this processing without having to change processing on external computer terminals. Processing on the interpreter also reduces the processing load.

Industrial Applicability

The present invention may be applicable to image processing on image forming devices and to the design and development of the image forming devices.

What is claimed is:

1. An image forming device comprising analysis means for analyzing image data including vector data and data for setting a vector density (shade), means for converting the vector data to raster data after the analysis using an area gradation method that represents a halftone image with binary image data, and output means for outputting the raster data, said image forming device comprising:

means for generating an N*N mask matrix by applying a given density value of a halftone image to a predetermined dither matrix as a result of the analysis of said analysis means;

means for generating (N*N−1) number of N*N mask matrices by rearranging the N*N mask matrix, on a row and column basis, (N*N−1) times for a halftone image at least relatively low in density while maintaining the density of the N*N mask matrix and, at the same time, for combining the (N*N−1) number of N*N mask matrices with the original N*N mask matrix to form an (N*N)*(N*N) mask matrix;

means for generating a binary halftone image from multilevel image data via the (N*N)*(N*N) mask matrix for the halftone image at least relatively low in density;

condition judging means-for judging if the binary image obtained for a given halftone image via the N*N mask matrix for the density of the image becomes all "0:OFF"; and control means for using the (N*N)*(N*N) mask matrix if the binary image becomes all "0:OFF", and for, otherwise, using the N*N mask matrix.

2. The image forming device according to claim 1 wherein said condition judging means determines the condition based on a gray (shade) value of the vector and a line width of the vector.

3. The image forming device according to claim 2 wherein said condition judging means makes a judgement based on an inclination of the vector and/or the line length of the vector.

4. The image forming device according to claim 1, 2, or 3, wherein said means for generating the (N*N)*(N*N) mask matrix further rearranges the generated (N*N)*(N*N) mask matrix on a row and column basis to generate a final (N*N)*(N*N) mask matrix.

5. The image forming device according to claim 4, wherein, instead of using said means for generating the N*N mask matrix, non-volatile storage means is provided for storing N*N mask matrices generated by that means for different densities.

6. The image forming device according to claim 4, wherein, instead of using said means for generating the (N*N)*(N*N) mask matrix, non-volatile storage means is provided for storing (N*N)*(N*N) mask matrices generated by that means for different densities.

7. The image forming device according to claim 4, wherein, instead of using said means for generating the (N*N)*(N*N) dither matrix, non-volatile storage means is provided for storing (N*N)*(N*N) dither matrices pre-generated by that means.

8. The image forming device according to any one of claims 1, 2, or 3, wherein, instead of using said means for generating the N*N mask matrix, non-volatile storage means is provided for storing N*N mask matrices generated by that means for different densities.

9. The image forming device according to claim 8, wherein, instead of using said means for generating the (N*N)*(N*N) mask matrix, non-volatile storage means is provided for storing (N*N)*(N*N) mask matrices generated by that means for different densities.

10. The image forming device according to claim 8, wherein, instead of using said means for generating the (N*N)*(N*N) dither matrix, non-volatile storage means is provided for storing (N*N)*(N*N) dither matrices pre-generated by that means.

11. The image forming device according to any one of claims 1, 2, or 3, wherein, instead of using said means for generating the (N*N)*(N*N) mask matrix, non-volatile storage means is provided for storing (N*N)*(N*N) mask matrices generated by that means for different densities.

12. The image forming device according to any one of claims 1, 2, or 3, wherein, instead of using said means for generating the (N*N)*(N*N) dither matrix, non-volatile storage means is provided for storing (N*N)*(N*N) dither matrices pre-generated by that means.

13. An image forming device comprising analysis means for analyzing image data including vector data and data for setting a vector density (shade), means for converting the vector data to raster data after the analysis using an area gradation method that represents a halftone image with binary image data, and output means for outputting the raster data, said image forming device comprising:

means for generating (N*N−1) number of N*N dither matrices by rearranging an N*N dither matrix, on a row and column basis, (N*N−1) times and, at the same time, for combining the (N*N−1) number of N*N dither matrices with the original N*N dither matrix to form an (N*N)*(N*N) dither matrix;

means for generating an (N*N)*(N*N) mask matrix by applying a decsity value of a given halftone image to said dither matrix as a result of the analysis of said analysis means;

menas for generating a binary halftone image from the multi-level image data via the (N*N)*(N*N) mask matrix;

condition judging means for judging if the binary image obtained for a given halftone image via the N*N mask matrix for the density of the image becomes all "O:OFF"; and control means for using the (N*N)*(N*N) mask matrix if the binary image becomes all "O:OFF", and for, otherwise, using the N*N mask matrix.

* * * * *